Figure 1:
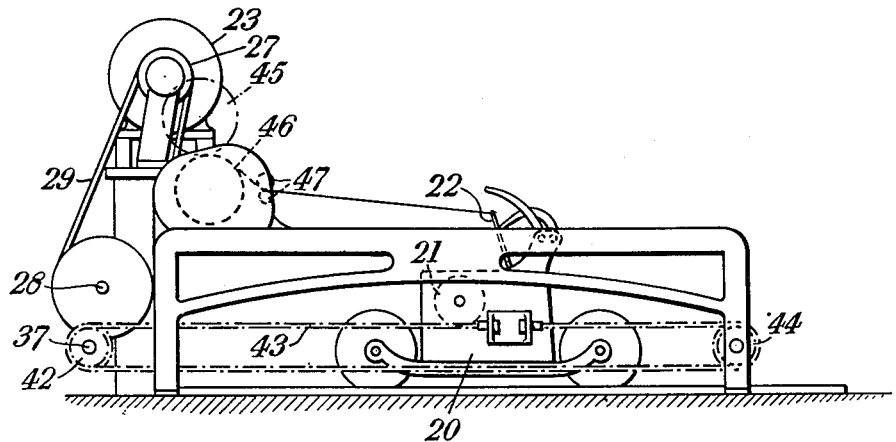

Nov. 22, 1955  N. H. CHAMBERLAIN ET AL  2,724,231

SPINNING MULES

Filed Jan. 21, 1953  10 Sheets-Sheet 1

Inventors
Norman Henry Chamberlain
and Brian Edmund King
By Moses, Nolte, Crews and Berry
Attorneys

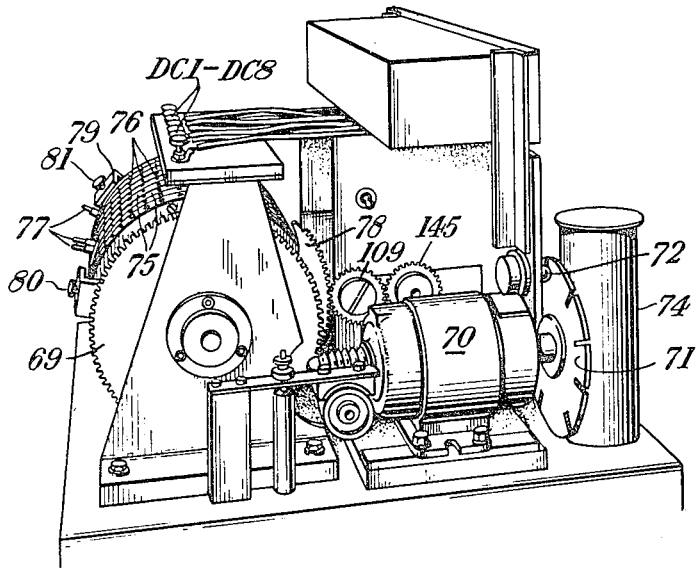
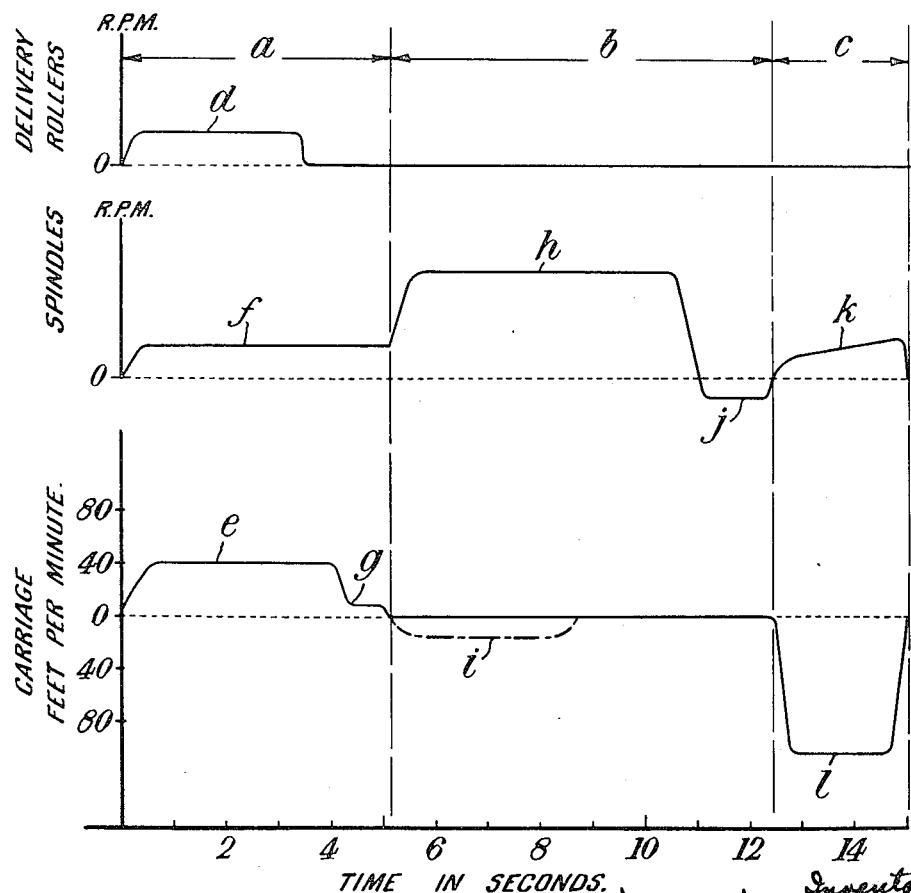
Fig. 4.
Fig. 5.

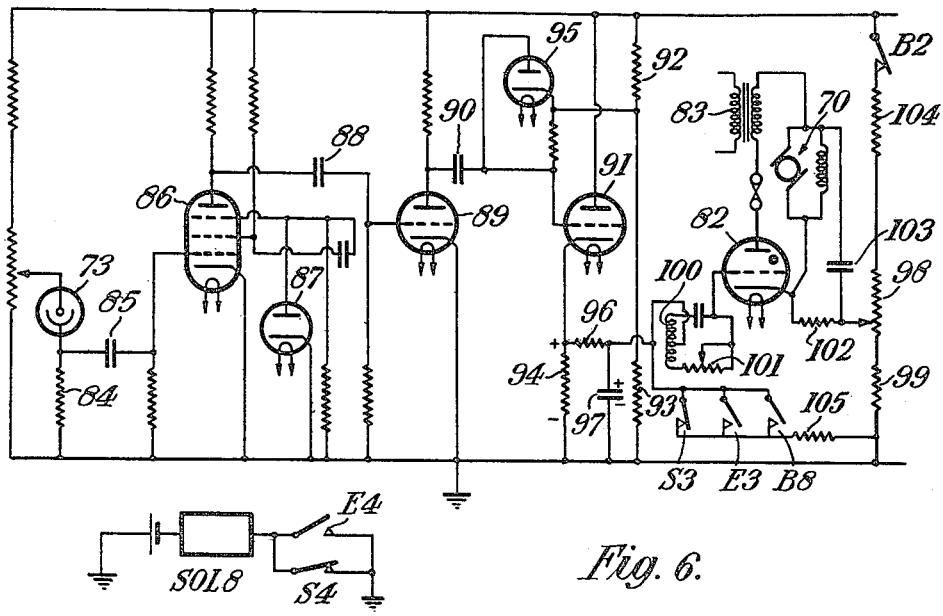
Fig. 6.
Fig. 6A.
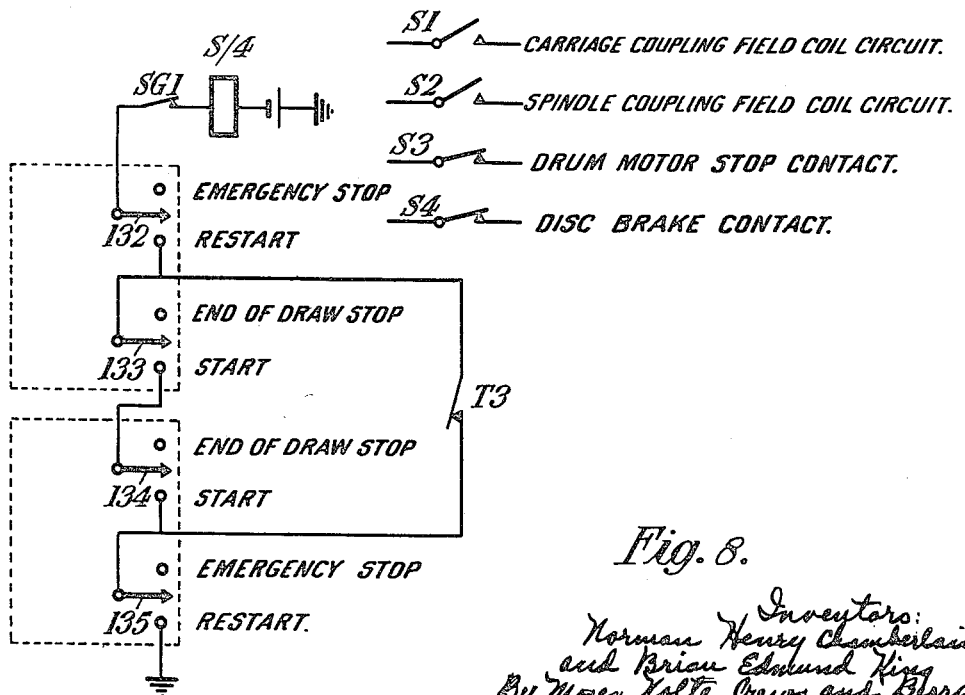
Fig. 8.

Nov. 22, 1955   N. H. CHAMBERLAIN ET AL   2,724,231
SPINNING MULES
Filed Jan. 21, 1953   10 Sheets-Sheet 8
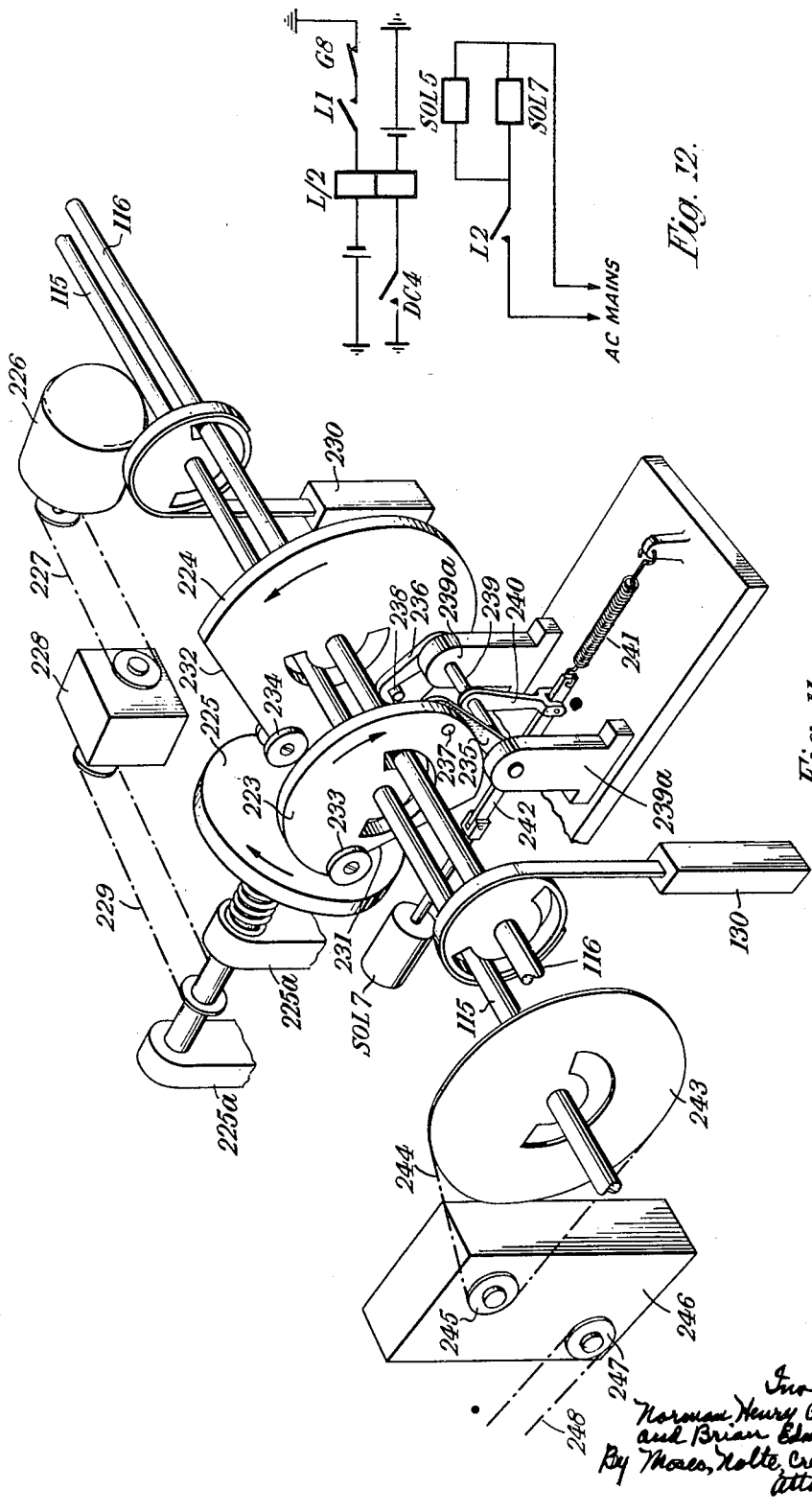

Nov. 22, 1955   N. H. CHAMBERLAIN ET AL   2,724,231
SPINNING MULES
Filed Jan. 21, 1953   10 Sheets-Sheet 9

Inventors
Norman Henry Chamberlain
and Brian Edmund King
By Moses, Nolte, Crean and Barry
Attorneys United States Patent Office 2,724,231
Patented Nov. 22, 1955

2,724,231
SPINNING MULES

Norman Henry Chamberlain, Leeds, and Brian Edmund King, Prestwich, England, assignors to T. M. M. (Research) Limited, Oldham, England, a British company Application January 21, 1953, Serial No. 332,294

Claims priority, application Great Britain January 28, 1952

31 Claims. (Cl. 57—41)

This invention relates to spinning mules, and more particularly to improved apparatus for driving and regulating the speed of various moving parts such as the spindles and the carriage, and for controlling and coordinating the functions of the mule at the appropriate times throughout the machine cycle.

In conventional mules, driving and speed-controlling apparatus is complicated in design, somewhat inaccurate in operation, difficult to adjust, and can only be synchronised to perform the functions necessary for the spinning of a perfect yarn by the exercise of considerable skill and ingenuity, and usually by trial-and-error methods. The apparatus is purely mechanical in character, consisting of an assembly of gears, clutches, levers, belts, ropes etc. so designed as to effect the necessary co-ordinated and timed movements of the spindles and carriage by mechanical means only.

According to the present invention, this complicated mechanical apparatus for driving and regulating the speed of various moving parts, and determining the times in the machine cycle at which the same will respectively be started and stopped, is replaced by a control system, preferably electrical, including adjustable timing means, and devices controlled thereby for performing the various operations of the mule as required. This substitution enables such operations to be synchronised with considerable accuracy, and readily adjusted to suit different spinning conditions. It also results in a considerable simplification of the mule, permits speeding up of the machine cycle because of reduction of mechanical inertia of the driven parts, decreases the amount of skilled labour required and enables a product of more uniformly high character to be made in less time.

The objects of the invention comprise the provision of controlling and controlled apparatus of the character referred to, and the provision of improved mechanisms for performing various mule operations, adapted for use with such a controlling system or otherwise.

Generally speaking, the invention embodies a control system by which energy may be transmitted to driving mechanisms, of such character as to vary the speed thereof as required at different times in the machine cycle, and in connection with auxiliary devices, to start and stop the same. In the form of the invention fully developed herein, separate variable speed driving mechanisms are provided for the spindles and the carriage respectively, and an adjustable electrical control system operable upon said driving mechanisms to control the duration of the various functions of the mule, to effect the variations in speed of the carriage and spindles required during the outward and inward runs of the carriage, and to determine the timing, in relation to the machine cycle, at which such speed variations are effected. Preferably also, the control system serves to control the delivery rollers, so that they are started and stopped at the proper times in the machine cycle.

Certain features of the mule may be constructed in accordance with the normal previous practice, to wit, the creel, the delivery rollers, the carriage, the spindles, the tin roller, the faller and counterfaller, and the mechanism for imparting the necessary shaping and building movement to the faller. It is therefore possible to utilize a considerable amount of present construction or design in connection with the invention.

The faller and counterfaller, while they may be conventional in construction as stated above, are preferably moved from their operative to their inoperative positions and vice versa at proper times by means comprised within the invention.

It will be noted that the invention preferably comprises arrangements whereby the movements of the various moving parts, the spindles, carriage, etc., are all controlled in timed relation to each other by the control system herein referred to. The invention is however not limited to such conjoint controlled operation, since various features thereof, such as control of carriage movements, or of spindle movements, may usefully be employed without necessarily employing the particular arrangements herein described for controlling other moving parts. It will also be observed that the invention comprises improved means for operating and controlling the movements of parts during particular operations, such as the backing-off of the spindles, and the winding-on operation.

In one embodiment of the invention, the electrical control system of the mule comprises a set of voltage shaping circuits which are selectively applicable to the mechanism for driving the spindles at the appropriate times in the machine cycle to effect appropriate variations in the speed of the spindles, a second set of voltage shaping circuits which are selectively applicable to the mechanism for driving the carriage at the appropriate times in the machine cycle to effect appropriate variations in the speed of the carriage, an electrical relay system for automatically applying at the proper times during the outward and inward runs the voltage shaping circuits to their associated driving mechanisms, and means for automatically reversing the direction of drive of the carriage after completion of each run.

Preferably the carriage and spindles are each driven from an electric motor or other prime mover through the agency of a magnetic slip coupling excited as required by the associated voltage shaping circuits.

The invention renders it possible to dispense with the conventional headstock, and it will not be necessary to mount the delivery rollers on a stationary support and the spindles and tin roller on a carriage which moves to and fro in relation to said support; that is to say, these parts could be reversed in position, if convenient, with the spindles and tin roller on the stationary support and the delivery rollers on the carriage. It should therefore be understood that the expression "carriage," as used in the appended claims, is to be taken as signifying a movable member which carries one of the two elements, spindles or delivery rollers, which must be moved to and fro in relation to the other, but not necessarily the spindles only.

The invention is applicable to the spinning of various fibres, a woollen mule only, however, being illustrated and described in detail herein.

In the case of a woollen mule, the delivery rollers are driven only during the initial portion of the outward run of the carriage. The delivery rollers therefore can be driven, preferably from the prime mover employed for driving the carriage through an electrically controllable coupling, switch mechanism actuated by the carriage serving, through the agency of the relay system, to operate the coupling so as to start and stop the delivery rollers at the appropriate times in the machine cycle. In the case, however, of a mule for spinning cotton, the "... are sometimes required to deliver sliver while the ... is stationary, this movement of the rollers taking place while the spindles are turning at high speed to impart twist to the yarn and replacing the jacking-up motion imparted to the carriage in the woollen mule. Also it is sometimes desirable in a cotton mule to give the delivery rollers a small movement during the inward run of the carriage. Provision for this may be made by driving the delivery rollers through a third magnetic slip coupling to which appropriate voltage shaping circuits are applied as necessary by the electrical relay system.

The electrical control system of the mule, in the sense of means for producing controlling impulses or voltages, has associated therewith what may be termed a timing control member, which is movable cyclically to actuate contacts at different points in its travel, by which such voltages or controlling impulses are caused to control the functions of the mule at the required times.

This timing control member is most conveniently a rotary drum upon which contacts may be placed in adjustable positions, to engage with fixed contacts at required times. This drum makes one complete revolution each machine cycle and in a preferred embodiment of the invention means are provided for synchronizing its movements with those of the carriage.

In a preferred embodiment of the invention means are provided for varying the spindle speed during the inward run of the carriage in such manner that such speed will be controlled by the level of the yarn which is being wound on the cop at any moment. By this means the desirable result is obtained that, during the winding-on operation, the length of unwound yarn extending from the cop to the nip of the delivery rollers will decrease at substantially the same rate as that at which the carriage is moving in, as will be described.

Figure 2:
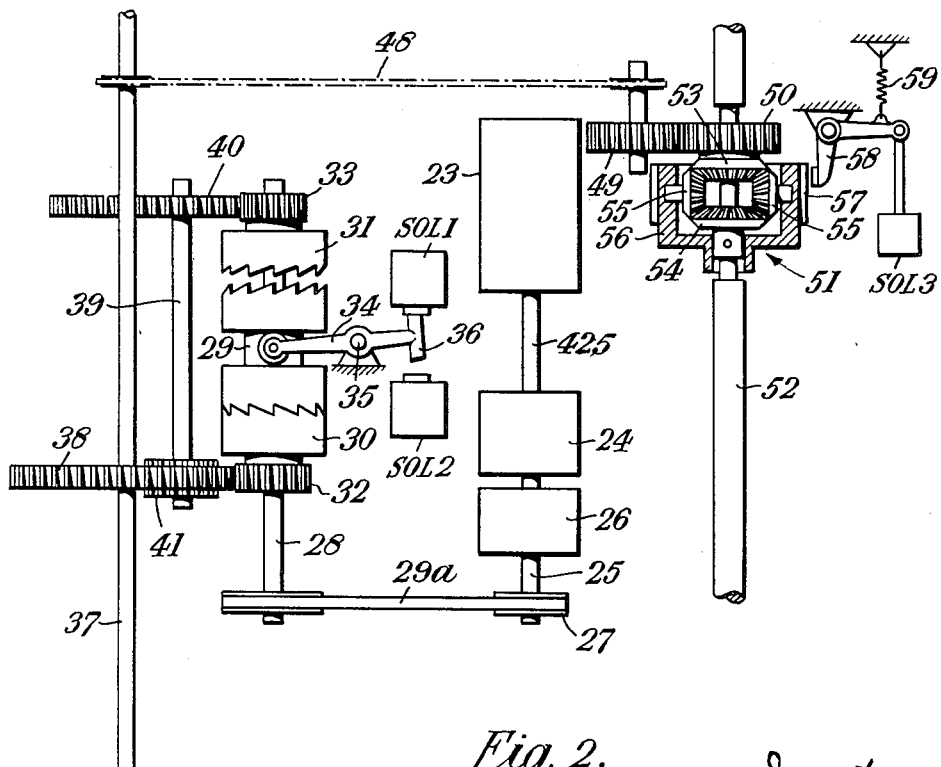
Figure 3:
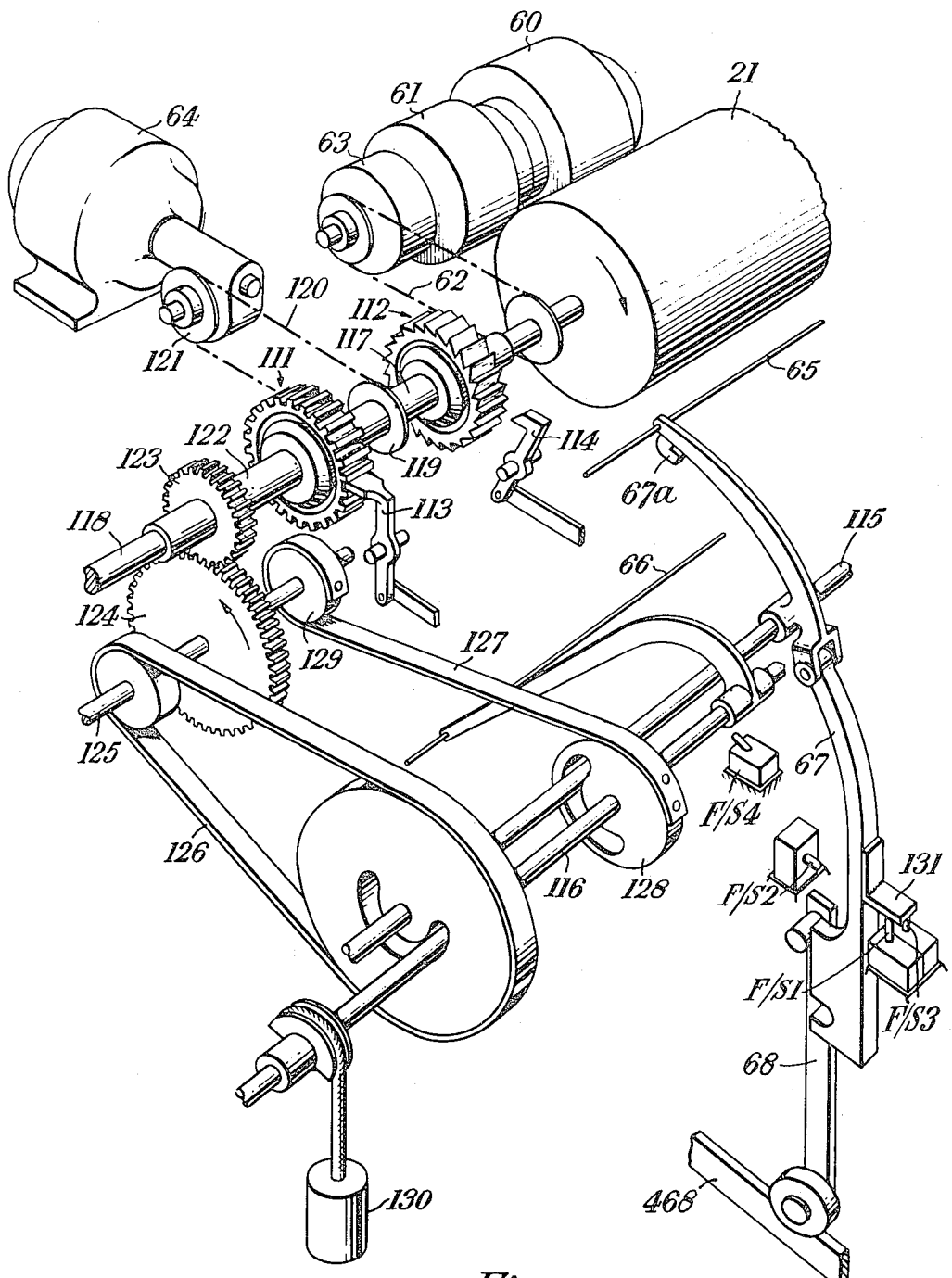
Figure 9:
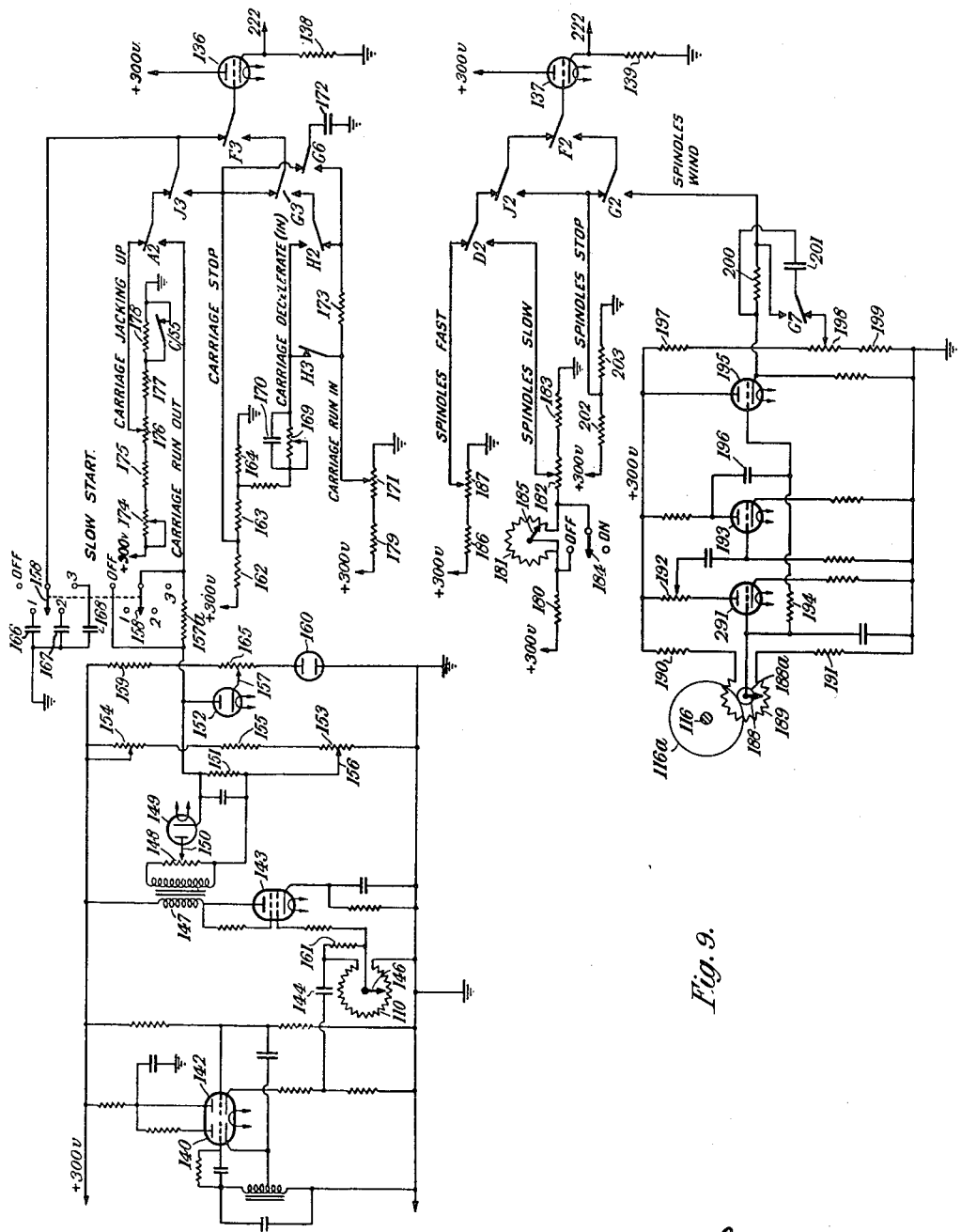
Figure 10:
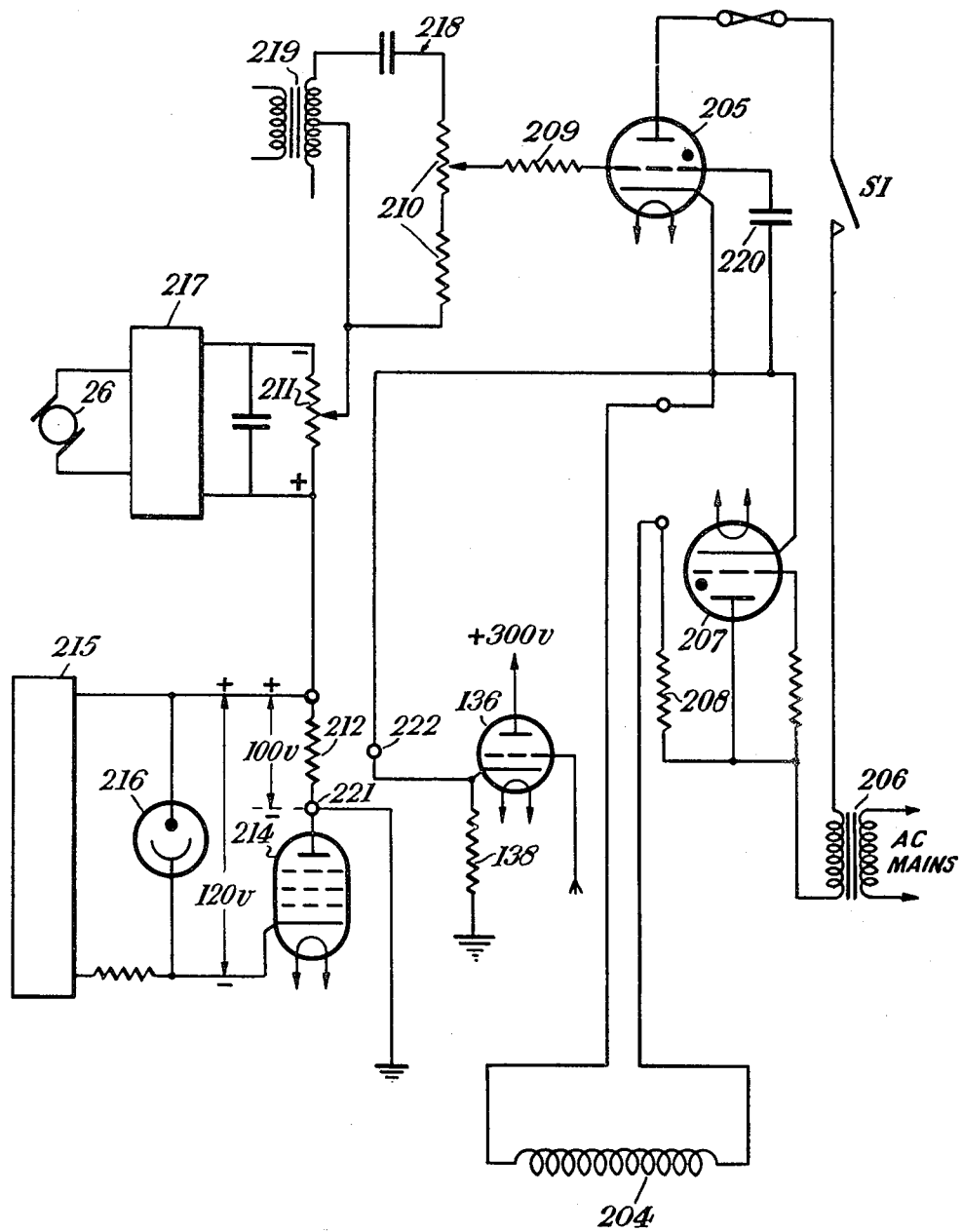
Figure 13:
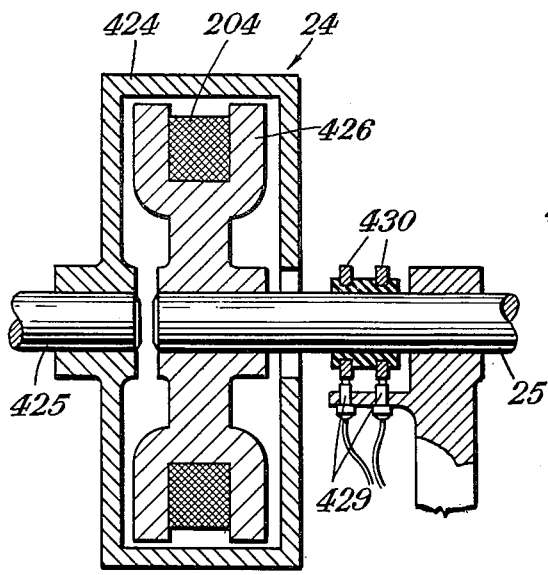
Figure 14:
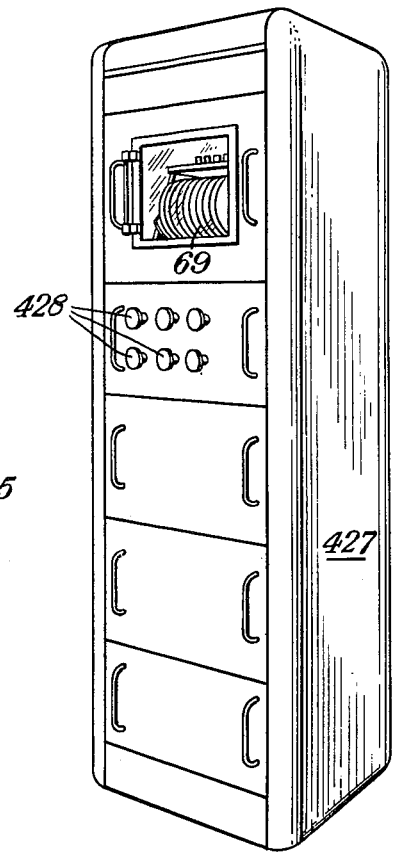
Figure 15:
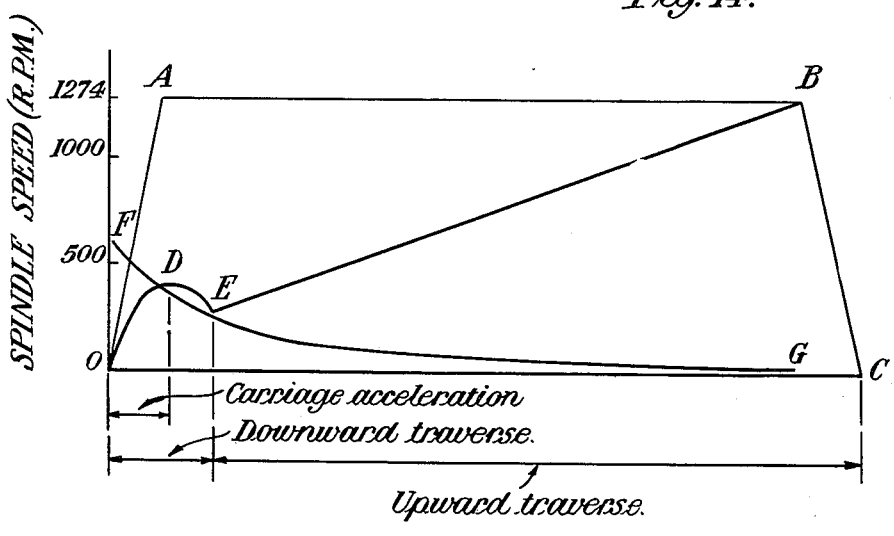
Figure 16:
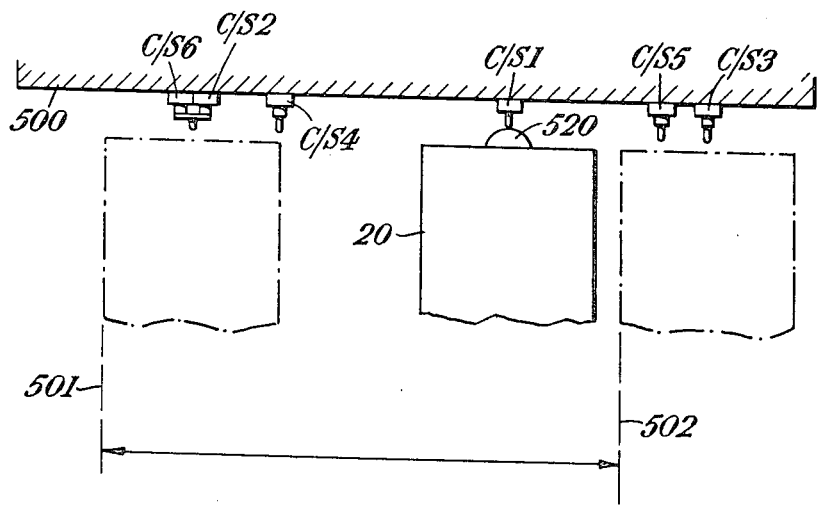
Figure 17:
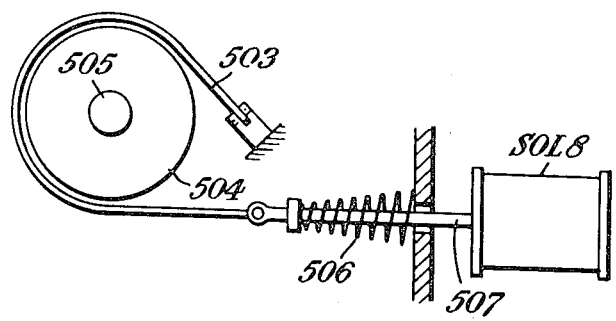

One specific embodiment of woollen mule will now be described in detail, by way of example, with reference to the accompanying drawings, in which:

Fig. 1 is a diagrammatic side elevation of the mule,

Fig. 2 is a diagrammatic plan view, on a larger scale, of the mechanism for driving the carriage, Fig. 3 is a diagrammatic perspective view showing the mechanism, mounted on the carriage, for driving the spindles, imparting backing-off movement to the spindles and moving the faller and counterfaller to and from their operative positions, Fig. 4 is a perspective view of the control drum and certain associated mechanisms, Fig. 5 shows graphically the speeds required in a typical case at different times in the machine cycle for the delivery rollers, the spindles and the carriage, Fig. 6 is a circuit diagram showing the speed control circuit for the motor driving the control drum, Fig. 6A is a detail circuit diagram in connection with the circuit shown in Fig. 6, Figs. 7A–7T inclusive are circuit diagrams showing the main relay system, Fig. 8 is a circuit diagram showing the start-stop circuit, Fig. 9 is a circuit diagram showing the voltage shaping circuits, Fig. 10 is a circuit diagram showing how the excitation voltages are applied to the slip coupling for driving the carriage, Fig. 11 is a diagrammatic perspective view showing an alternative form of backing off mechanism, Fig. 12 shows a modification of the main relay system appropriate for use with the backing off system shown in Fig. 11, Fig. 13 is a diagrammatic cross section through one of the slip couplings, Fig. 14 is a perspective view of the control cabinet, Fig. 15 is a graph correlating spindle speed and carriage speed during the inward run, Fig. 16 is a diagram illustrating the lay-out of the carriage operated switches, and Fig. 17 is a diagram showing one of the solenoid operated brakes.

Like reference characters designate like parts throughout the figures.

Referring first of all to Figs. 1–3, the mule comprises a carriage 20, supporting a tin roller 21 from which the spindles 22 are driven by the usual bands not shown. The carriage is driven by an electric motor 23, mounted on the machine framework, through the agency of an electro-magnetic slip coupling 24 of known type to the field coil of which suitable excitation voltages are supplied as later described.

As shown in Fig. 13, the coupling comprises an armature drum 424, driven by the motor shaft 425, and a rotor 426 mounted on an output shaft 25 and carrying a coil 204 (see also Fig. 10). The ends of the coil 204 are connected by conductors (not shown) to slip rings 430 to which the excitation voltages are applied by means of brushes 429. When no current is passing through the coil 204, the drum 424 rotates without imparting movement to the output shaft 25. On application of a D. C. excitation voltage to the coil 204, however, an electromagnetic drag is created between the drum 424 and the rotor 426, causing the output shaft 25 to rotate at a speed determined by the magnitude of said excitation voltage.

On the driven shaft 25 of the coupling 24 are mounted an A. C. generator 26 excited by a permanent magnet, and a pulley 27, which drives a clutch shaft 28 through a chain drive 29a. Fast on the shaft 28 is a clutch sleeve 29 and loose on the shaft 28 are a pair of clutch sleeves 30, 31 carrying gear wheels 32, 33 respectively.

The clutch sleeve 29 is controlled as to position by a lever 34, pivoted at 35 and carrying an armature 36, cooperating with a pair of solenoids Sol 1 and Sol 2, which are alternatively energised, as later described, to cause one or other of the gear wheels 32, 33 to be driven by the shaft 28. When, as shown in Fig. 2, the clutch sleeves 29, 30 are engaged, a back shaft 37 is directly driven from the clutch shaft 28 through the agency of a gear wheel 38 meshing with the gear wheel 32. When the clutch sleeve 29 is moved to its alternative position, to engage the clutch sleeve 31, the back shaft 37 is driven in the reverse direction through the agency of a countershaft 39, carrying gear wheels 40, 41 meshing respectively with the gear wheels 33, 38.

The back shaft 37 carries a sprocket 42 (Fig. 1) engaging a chain 43, which is attached at its opposite ends to the carriage 20 and passes around a sprocket 44 mounted on the machine frame. It will be appreciated, therefore, that by reversing the energisation of the solenoids Sol 1 and Sol 2 the direction of movement of the carriage can be reversed.

The material to be spun is wound on bobbins 45, one of which is indicated in Fig. 1, which are friction driven in the usual way from bobbin drive drums 46, the material passing between the delivery rollers 47 on its way from the bobbins to the spindles. The drive to the delivery rollers is taken from the back shaft 37 through a chain drive 48 (Fig. 2), gear wheels 49, 50 and a differential gear 51 to the shaft 52 carrying the lower delivery rollers. The upper delivery rollers are driven by frictional contact with the lower rollers and the drums 46 are driven from the shaft 52 by gearing (not shown) in the usual way. The differential gear 51 comprises a pair of sun wheels 53, 54, fixed respectively to the gear wheel 50 and to the shaft 52, and planet wheels 55 mounted on a carrier 56 formed with peripheral ratchet teeth 57. A pawl 58 is normally held by a spring 59 clear of the ratchet teeth 57, and no drive is then transmitted to the shaft 52. When, however, a solenoid Sol 3 is energised, the pawl 58 is moved to engage the ratchet teeth 57, thereby locking the planet carrier 56 so that the chain drive 48 is then effective to drive the shaft 52 and therefore the delivery rollers.

The tin roller 21 (Fig. 3) is driven from an electric motor 60 on the carriage, through the agency of an electro-magnetic slip coupling 61, identical with the coupling 24 shown in Fig. 13, and a chain drive 62. The output shaft of the coupling 61 drives an A. C. generator 63 precisely similar to the generator 26 (Fig. 1). Appropriate excitation voltages are applied to the coupling 61, as later described, to cause the spindles to be driven at the appropriate speeds as required at different times in the machine cycle. A second electric motor 64 on the carriage serves, as later described, to drive the tin roller in the reverse direction for backing-off. It is also effective to move the faller wire 65 and the counterfaller wire 66 to and from their operative positions. The faller leg is shown at 67 in Fig. 3. This is supported during the inward run of the carriage on the copping bowl, shown diagrammatically at 68, and the copping bowl coacts with the normal shaper rail indicated at 468 to impart movement to the faller wire 65 during each inward run of the carriage to present the yarn at the appropriate level on the spindles.

The complete cycle of operation of the woollen mule involves the following stages, which will be best understood by reference to Fig. 5. In this figure the speed of movement of the delivery rollers, the spindles and the carriage are plotted as ordinates against time as abscissae. The zone $a$ denotes the outward run of the carriage, the zone $b$ the period between the outward and inward runs of the carriage and the zone $c$ the inward run of the carriage.

1. The delivery rollers 47 commence delivery, as indicated at $d$, the carriage starts on the outward run (see $e$), and the spindles revolve relatively slowly (see $f$) to insert the necessary drafting twist. These operations continue throughout a large part of the outward run of the carriage, and as the carriage speed is approximately equal to the surface speed of the delivery rollers no draft takes place.

2. When the carriage reaches a predetermined position in its outward run the delivery rollers are stopped, the spindles continue to revolve at the same speed, and the carriage continues to the outward end of its run, the rollers remaining stationary, to give the necessary draft. At or about the instant when the delivery rollers stop, the carriage speed commences to decrease (see $g$), and the deceleration is arranged to be such that, when the carriage reaches the end of its run, its speed has fallen substantially to zero. The carriage then stops and remains stationary while the spindles accelerate to a high speed of rotation (see $h$) in order to insert the final or spinning twist into the yarn. Alternatively, during this high-speed twisting operation, the carriage instead of remaining stationary may move in slightly (see $i$) to avoid over-tensioning of the yarn by the take-up in length occasioned by the insertion of the high twist. This is known as "jacking-up," and the distance moved by the carriage during jacking-up must be variable to suit the type of material and counts of yarn being spun.

3. After the conclusion of the twisting operation and its accompanying jacking-up, the spindles are stopped and then reversed (see $j$) for a few turns to unwind the coils of yarn from the spindle point. This reversal of the spindles is known as "backing off." During backing off, the faller descends, and the counter-faller ascends to maintain the tension in the yarn.

4. The carriage commences the inward run, the spindles revolve in the normal direction (see $k$) to effect "winding on" and the faller falls and then rises during the inward run to shape the cop. The carriage travels at a higher speed (see $l$) during the inward run than during the outward run, and the counterfaller (or an equivalent member in contact with the yarn) controls the speed of the spindles, as later described.

5. At the inward end of the run, the carriage stops, the spindles cease to revolve and the faller and counterfaller assume their inoperative positions clear of the yarn.

The movements of the delivery rollers, the spindles and the carriage are caused automatically to conform with requirements indicated in Fig. 5 by an electrical control system. This comprises a relay system Figs. 7A—7T, associated voltage shaping circuits Fig. 9, and circuits Fig. 10 for applying to the slip couplings 24, 61 the voltages derived from the voltage shaping circuits. This control system is housed within a cabinet 427 (Fig. 14) connected to the mule by electrical conductors (not shown) for supplying appropriate control voltages to the two slip couplings 24, 61 and for connecting to the control system certain switches and solenoids which are mounted on the mule. The cabinet 427 also contains a rotary control drum 69 referred to later. On the front of the cabinet are mounted six adjustable dials 428, which serve to adjust various resistances in the control system as later described. Other resistances in the control system can only be adjusted by those having access to the interior of the cabinet.

The switches comprise switches C/S1–C/S6 (Fig. 16) which are operated by the carriage at various points in its travel and switches F/S1–F/S4 (Fig. 3) mounted on the carriage and operated by the faller. The solenoids are Sol 1, Sol 2 and Sol 3 (Fig. 1) on the machine framework, the first two of which serve to reverse the direction of motion of the carriage and the third of which serves to control the movement of the delivery rollers, Sol 4 and Sol 5 (Fig. 7M) on the carriage which serve respectively to move the faller and counter faller to and from operative position and to impart backing-off movement to the spindles, Sol 6 (Fig. 7P) on the carriage for applying a brake to the tin roller and Sol 8 (Fig. 6A) in the control cabinet for applying the brake to the motor driving the control drum. The alternative embodiment shown in Fig. 11 includes a further solenoid Sol 7 for controlling a latch for locking the faller in inoperative position.

The following adjustments can easily be made, as described in more detail later, and some of them can be carried out without stopping the mule:

1. The amount of draft imparted to the yarn can be adjusted by moving a carriage-actuated switch C/S1 for stopping the delivery rollers so that it is operated by the carriage at the desired point in the outward run of the carriage.

2. The spindle speed during the outward run (drafting twist) and also during the high-speed twisting period immediately following the outward run, are independently adjustable to any required value by means of two of the dials 428. These serve respectively to adjust resistances 182, 187 (Fig. 9).

3. The carriage speed during the constant-speed (initial) portion of the outward run is adjustable within wide limits and controlled in the same manner from another of the dials 428 which adjusts the slider 156 (Fig. 9).

4. The point in the outward run at which the carriage speed commences to fall is variable at will.

5. The rate at which the carriage speed falls during the deceleration period is variable and can be set from another of the dials 428, which adjusts the slider 150 (Fig. 9).

6. The initial acceleration of the carriage from rest at the beginning of the outward run can be varied to suit different materials being spun. Normally three different initial accelerations are provided and selected by means of a three-point rotary switch 158 (Fig. 9).

7. The extent of jacking-up during the high-speed twisting period can be varied by an adjustable switch C/S5 (Fig. 9) and the carriage jacking-up speed can be adjusted by one of the dials 428 which adjusts the resistance 176 (Fig. 9).

8. The carriage speed during the inward run can be varied within limits at will. This adjustment, however, is not normally used, as the aim is generally to run the carriage in as fast as possible consistent with smooth operation.

9. The total time required for one complete cycle of operations of the mule can be varied by means of another dial 428 which adjusts the resistance 98 (Fig. 6).

The cylindrical control drum 69 (Fig. 4) is placed horizontally and is rotatable about its longitudinal axis. It is turned by a geared-down electric motor 70 at a speed which is adjustable. The speed of the driving motor is held constant at any selected value by a stabilising circuit shown in Fig. 6, so that variations in mains voltage, bearing friction etc. do not cause it to alter appreciably. The motor 70 drives an interrupter disc 71, having a number of radial slots, which is disposed between a lamp 72 and a photo-electric cell 73 (Fig. 6), contained in a housing 74 (Fig. 4). The output of the photo-electric cell is used to hold the speed of the motor constant as later described with reference to Fig. 6. The control drum 69 makes one complete revolution for each complete cycle of mule operations. Circumferentially disposed around the drum are a number of parallel tracks 75 which are pierced with holes 76 at every 5° of arc; contact pins 77 are placed in the holes of these tracks so as to project from the drum surface. As the drum turns, each of these pins closes, at some position of the drum dependent on the setting of the pin 77 in its track, an associated drum contact D. C. Eight of these drum contacts, in all, indicated in the drawings as DC1—DC8, are provided and these, in conjunction with a number of carriage operated switches, C/S1—C/S4 and C/S6, serve to control the relay system shown in Fig. 7. These relays, when excited, bring into operation the various voltage shaping circuits (shown in Fig. 9) which provide the exciting current for the coils of the carriage and spindle couplings.

Six carriage-operated switches in all are provided, and they perform the following functions:

C/S1 stops the delivery rollers at some point in the outward run.

C/S2 changes the carriage drive clutch and starts the delivery rollers at the end of the inward run.

C/S3 changes the carriage drive clutch at the end of the outward run.

C/S4 starts carriage deceleration as the inward run nears completion.

C/S5 applies stop excitation to the carriage at the end of the jacking up period.

C/S6 starts the drive to the fallers at, or immediately prior to, the end of the inward run.

The operative relationship of the switches C/S1-C/S6 is shown in diagrammatic plan view in Fig. 16. The carriage 20 is there shown having a projection 520 arranged to actuate the switches at various times as the carriage moves from the inward end 501 to the outward end 502 of its run. The switches C/S4, C/S1 and C/S5 are adjustably mounted on a rail 500 adjacent the path of movement of the carriage.

Each individual track 75 on the control drum corresponds to a separate function of the mule, and the contact pin or pins 77 in a particular track determines the point in the cycle of operations at which a particular function will operate. By moving the contact pin 77 to different holes 76 this time may be varied at will. Thus, one track controls in conjunction with the carriage-operated switches the starting and stopping of the cycle, another the point at which drafting twist ceases and spinning twist starts, another the beginning of backing-off, and so on.

On the ends of the control drum 69 are a pair of toothed quadrants 78, 79, which serve a purpose to be described later. These quadrants are secured to the drum by screws 80, 81 each of which can be engaged in one of a series of holes in the drum to vary the setting of its quadrant in relation to the drum.

Provision is made, as later described, for synchronisation of the movements of the control drum and carriage at the end of each outward and inward run of the carriage.

The speed stabilising circuit shown in Fig. 6 will now be described. This shows certain contacts in the position they occupy when the mule is stopped. As soon as the mule is started, contacts S3 and S4 (Fig. 6A) open as later described. The motor 70 for driving the control drum 69 is supplied with half-wave rectified current from a grid-controlled gas-filled valve 82, the anode of which is connected to the secondary of a transformer 83. The pulses of current in the photo-electric cell 73 flow through the resistance 84 and are applied by condenser 85 as positive pulses to the grid of a valve 86. This valve, in association with a diode 87, constitutes a transitron trigger circuit from which positive rectangular voltage pulses are passed by condenser 88 to the grid of a valve 89. Negative pulses are passed by condenser 90 to the grid of a cathode follower valve 91, the grid of which is maintained at a potential of about +205 volts, by a potentiometer chain 92, 93. An approximately equal potential difference is maintained across the cathode resistance 94 of the valve 91. A diode 95 clamps the upper edge of the pulse wave form. The wave form across the resistance 94 is integrated by the circuit 96, 97, and the potential difference across the condenser 97 varies inversely with the frequency of the pulses applied to the grid of the valve 86 and therefore the speed of the motor 70.

The grid-cathode voltage of the valve 82 consists of three components, viz.:

(I) The potential difference across condenser 97.

(II) The potential difference across the lower portion of resistance 98 and across resistance 99.

(III) A phase-shifted A. C. wave form derived from the secondary 100 of a transformer and adjustable in phase in relation to the applied anode voltage by a resistance 101.

Increase in the potential difference across condenser 97 increases the current through the valve 82 and therefore the speed of the motor 70 and vice versa, and the circuit therefore tends to keep the motor running at substantially constant speed. The resistance 102 and condenser 103 constitute an anti-hunting circuit. By adjustment of the slider of resistance 98 the speed of rotation of the control drum 69 can be varied.

The circuit includes certain relay contacts for stopping or accelerating the control drum 69 as required. When relay B in the main relay system is excited, as later described, contact B2 opens and B8 closes. Current through the potentiometer chain 104, 98, 99 ceases and the cathode of the valve 82 falls to earth potential. Condenser 97 is discharged by contact B8 through resistance 105 and the centre tap of 100 becomes positive to earth to an extent determined by the potential dividing action of the resistances 96 and 105. The grid of valve 82 is therefore driven slightly positive to cathode and the motor current increases to a maximum, thereby accelerating the drum to its maximum speed.

On excitation of another relay, also as later described, contacts E3 and E4 of relay E close. Closure of E4 (Fig. 6A) energises a solenoid Sol 8 to apply a brake (Fig. 17) to the disc 71 (Fig. 4). Closure of E3 discharges condenser 97 and makes the grid of valve 82 slightly positive to earth. Since, however, at this time contact B2 is closed, the voltage across resistance 99 and the lower part of resistance 98 is sufficient to cut off the current in valve 82 altogether, so stopping the motor and drum.

The brake actuated by the solenoid Sol 8 is shown diagrammatically in Fig. 17. It comprises a brake band 503 coacting with a disc 504 on the shaft 505 carrying the disc 71. The brake is normally held off by a spring 506 but when the solenoid Sol 8 is energised an armature 507, connected to the band 503, is attracted to apply the band to the disc 504.

When a start switch is operated, also as described later, contact S3 opens to allow the motor to start and contact S4 opens to de-energise the solenoid Sol 8. On operation of an emergency switch, S3 closes to stop the motor and S4 closes to apply the brake to the disc.

Acceleration of the control drum is resorted to, as later described, for synchronisation purposes in the event of the carriage reaching the end of a run ahead of the drum. The special motor speed stabilising circuit of Fig. 6 is not however essential since if the controls are properly set the lack of synchronism between the carriage and the control drum will be very small. A synchronous motor could therefore be used for driving the control drum and the contacts E3 and E4 used to stop the motor of the control drum should the drum be ahead of the carriage as the latter nears the end of a run.

The main relay system shown in Figs. 7A–7T will now be described.

This system comprises a number of relays each designated by a letter, followed by a figure indicating the number of contacts associated with that relay. Thus A/4 means that A relay has four contacts. The main relay system is controlled conjointly by the above mentioned drum contacts DC1—DC8, made by the control drum at times in the machine cycle determined by the setting in relation to the drum of the contact pins 77 (Fig. 4), and by the carriage operated switches C/S1—C/S4 and C/S6. Its effect is to connect, by means of contacts D2, J2, F2, G2, A2, J3, F3, G3 (shown in Figs. 7S and 7T) the appropriate voltage shaping circuits to the spindle and carriage couplings at the proper times in the machine cycle.

In Figs. 7A–7T, all relay contacts are shown in the position which they occupy when the associated relay is deenergised. For simplicity a battery is shown in association with each relay, but in fact all the relays shown in Figs. 7A–7T are excited from a common 50 volt D. C. supply, apart from relays P, R, Q and Y which are excited from the A. C. mains, and from relays B and L. The relays P, R (Fig. 7N), Q and Y (Fig. 7O) are double acting relays, each having two operating coils. Excitation of one coil of each of these relays shifts the associated contact, which remains shifted until the other coil of the relay is excited. Relays B (Fig. 7C) and L (Fig. 7L) are pulse-excited relays, i. e. they are relays which, on closure of a switch, operate their contacts only momentarily. Thus B relay is excited by discharge of a condenser 107 connected across it, but ceases to be excited almost immediately as the discharge current from the condenser falls to zero. The condenser 107 is normally charged by the 300 volt supply, but on closure of contact T1 or U2 the condenser 107 is discharged through the lower coil of relay B to excite it. After discharge of the condenser, the current through the relay coil and the resistance 108 in series with it is insufficient to hold the relay in. Similarly relay L (Fig. 7L) is pulse-excited on closure of contact R4 or DC4. Relay M (Fig. 7H) is a two-step relay. Its contact M1 (shown in Fig. 7P) makes in response to excitation of the relay and remains made until the relay is again excited.

It is, as mentioned, essential that the inward and outward travel of the carriage, and the revolution of the control drum, shall keep constantly in step during the operation of the mule. To ensure this, a synchronising system is incorporated in the relay system which brings the carriage and the control drum into exact synchronism twice during each full cycle of mule operations, once when the carriage is at the extreme outer end of its run, once when it is at the extreme inner end of its run.

The action of the relay system will now be described in detail:

The mule draw will normally terminate with the drum contacts DC6, (Fig. 7E) and DC7 (Fig. 7B) made. These are operated by pins in different tracks but always make contact at the same instant. Considering therefore the case in which the control system and relays are switched on after such a normal stop, the relays J, (Fig. 7B) and C, (Fig. 7E) will immediately excite, and J relay locks in via contacts J1, D3. The relay K will not excite, because the two operating coils of this relay are connected in opposition. The opposed diagonals drawn across the coils of this relay K in Fig. 7E indicate opposition of coil fluxes. C relay does not lock in, as it is a single-wound relay not provided with a locking circuit, and ceases to be excited as soon as the drum moves and breaks drum contact DC6.

When relay J closes, contacts J2 in Fig. 7S and J3 in Fig. 7T, drop to their lower contacts and apply voltages, indicated as "spindles stop" and "carriage stop" respectively, derived from the voltage-shaping circuits, to the coupling excitation circuits via upper contacts F2 and F3 respectively. The spindle and carriage couplings are thus deprived of excitation while the control drum turns from drum contacts DC6, DC7 to drum contact DC1, (Fig. 7A), which is the starting contact proper. When drum contact DC1 makes, the following events occur:

(1) Relay A is excited and locks in via contacts A1, B1.
(2) Relay D is excited and locks in via contacts D1, A4.
(3) Contact D3 (Fig. 7B) releases J relay.
(4) Contact A3 (Fig. 7E) moves to its top contact and prepares a circuit for exciting E relay.
(5) Contact J2 (Fig. 7S) and J3 (Fig. 7T) rise to their top contacts, contact D2 (Fig. 7S) falls to its bottom contact and A2 (Fig. 7T) falls to its bottom contact. This applies to the spindle and carriage couplings respectively, excitation voltages from the voltage-shaping circuits which cause the spindles to turn at slow or drafting speed and the carriage to run out at constant speed. Both spindle speed and carriage speed can be set to any predetermined value by means of graduated controls associated with the voltage-shaping circuits.

The carriage now runs out at constant speed until the sector 78 (Fig. 4) on the control drum engages an idler 109 to turn a deceleration pinion 145 thereby causing, as later described, a rheostat 110 (Fig. 9) to be adjusted, after which the carriage speed decreases at a predetermined rate.

At some predetermined point in the outward run, the carriage operates, in passing, the carriage switch C/S1, (Fig. 7O), which excites the right hand coil of the double-acting relay Q. This pulls over and opens the contact Q1 (Fig. 7Q) to break the circuit to a solenoid Sol 3, thereby releasing the pawl 58 (Fig. 2) and causing the delivery rollers 47 to stop, as already described. The switch C/S1 is movable along a rail 500 (Fig. 16), running the length of the mule draw, and by fixing C/S1 in the correct position by means of a thumbscrew, the delivery rollers can be caused to stop at any predetermined point in the outward run.

The carriage is now approaching the end of its outward run, and the control drum is approaching drum contact DC2 (Fig. 7E) which should normally terminate the outward run. The sequence of relay operations which occurs next is dependent upon whether the carriage reaches the end of its outward run before drum contact DC2 makes, or vice versa. The third case, in which the two events occur absolutely simultaneously, is a theoretical possibility only. Two different sequences must, therefore, be described at the end of the outward run, viz.:

(A) Drum contact DC2 (Fig. 7E) makes before the carriage reaches the end of its run.

The following sequence then occurs:

(1) When drum contact DC2 closes, E relay is excited via A3 upper contact (A relay is still excited), and locks in via E1, B4. Contact E3 (Fig. 6) closes and stops the drum driving motor as already described, contact E4 (Fig. 6A) closes to energise the solenoid Sol 8 for applying the brake to the interrupter disc of the drum motor drive and contact E5 (Fig. 7D) closes to light an indicator lamp 141. Contact E2 (Fig. 7E) opens one of the operating coil circuits of K relay.

(2) K relay excites and locks in via K1. K1 as soon as it closes bridges the drum contact DC2, so that all relays remain held even if the drum overruns slightly and drum contact DC2 breaks after making.

The drum has now stopped, but the carriage and spindle excitations have not yet been effected. The carriage consequently runs on until it reaches the end of its run, and closes the carriage switch C/S3 (Fig. 7K). As this switch closes, it excites U relay. Contact U1 closes to excite relay Y, (Fig. 7O), whose contact Y1 changes over the excitation from the solenoid Sol 1 to the solenoid Sol 2, (Fig. 7R), so reversing the position of the clutch for driving the carriage as already described. Contact U2, (Fig. 7C) closes to pulse-operate B relay which, as already stated, would normally close only momentarily and then open again, even though contact U2 remains closed. B relay is provided with a locking circuit however, and locks in via B7, C1. Closure of B3 (Fig. 7G) excites relay F, which locks in via contacts F1, C2. Contacts F2, F3 apply stop excitation to the spindle and carriage couplings respectively. The relay sequence then continues as follows:

(3) A relay (Fig. 7A), releases via B1 as B relay excites. A2 returns to its upper contact and prepares for application of jacking-up excitation to the carriage coupling.

(4) D relay (Fig. 7A), releases via A4 as a relay is released. D2 (Fig. 7S) returns to its upper contact and prepares excitation for fast twist to the spindle coupling.

(5) E relay (Fig. 7E) releases via B4 as B relay excites and E3, (Fig. 6), restores the drum motor speed to normal, E4 (Fig. 6A) removes the brake on the interrupter disc, and E5 (Fig. 7D), extinguishes the synchronisation indicator lamp.

(6) A3 (Fig. 7E) drops to its lower contact as A relay releases, and C relay excites via A3, G4 and K1. Even if E2 has released when E relay releases, B6 will be open, and hence K relay will be excited and K1 closed, so that C relay can excite.

(7) When C relay excites, B relay releases via C1 and B6 closes.

(8) B3 opens to release F relay (Fig. 7G). The excitations for jacking-up and fast twist, already prepared, are thus applied to the carriage and spindles via F3 and F2 upper contacts. The carriage then jacks up at a predetermined rate determined by the graduated control 428, (Fig. 14) associated with the voltage-shaping circuit.

(9) Contact B6, (Fig. 7E) releases K relay and contact K1 opens.

(10) Either C relay (Fig. 7E) releases at once (if the drum has overrun slightly and opened drum contact DC2) or in any case as soon as the drum begins to move on again after restoration of motor speed by contact E3 (Fig. 6).

The carriage is now jacking up, the spindles turning at fast twist speed, and all relays are released.

The reason why B relay is pulse-excited is as follows: A relay must be able to release B relay at the proper time through C1. If B relay were normally excited on its bottom coil circuit it could not release until carriage switch C/S3 opened. However, since it is pulse excited, its bottom coil is de-energised after the condenser 107 has discharged and its upper coil circuit constitutes a holding circuit only, which breaks as soon as C1 opens.

The above description ended at the point at which all relays were released, the carriage jacking up and the spindles at fast twist. The second possibility mentioned above, namely that the carriage arrives at the end of its run before drum contact DC2 makes, will now be examined.

(B) Carriage reaches the end of its run before drum contact DC2 (Fig. 7E) makes.

The sequence is then as follows:

(1) When the carriage arrives at the end of its run, carriage switch C/S3 (Fig. 7K) closes, excites U relay as before, which pulse excites B relay, (Fig. 7C) and changes over the solenoids Sol 1 and Sol 2, (Fig. 7R). B relay locks in via B7.

(2) F relay is excited via B3 when B is pulsed and locks in via F1, C2. Contacts F2 and F3 drop to lower contacts, and apply stop excitation to spindles and carriage respectively via G2, (Fig. 7S), and G3, (Fig. 7T).

(3) B1 releases A relay, and A4 releases D relay. D2 rises to its upper contact and A2 rises to its upper contact, preparing the fast spindle excitation and jacking up excitation for application to the couplings as soon as F relay releases. A3 drops to its lower contact and prepares C relay for excitation by drum contact DC2 when the drum subsequently arrives at this contact.

(4) Contacts B2 and B8 (Fig. 6) operate, as already described, to increase the drum motor speed to maximum and the drum accelerates to close the gap in the minimum time. Contact B6 opens and prepares K relay to be excited by drum contact DC2. The drum runs on, with the carriage stationary, until drum contact DC2 makes.

The sequence then proceeds as follows:

(5) C relay is excited via G4, A3 (lower contact). Simultaneously K relay is excited by its upper coil and locks in via K1, even if the drum overruns slightly and drum contact DC2 breaks after making.

(6) B relay releases via C1. K relay releases by B6 closing and cancelling the flux in the upper coil. K1 releases C relay, or if drum contact DC2 is still made, prepares C relay for release as soon as the drum moves on. C2 and B3 together release F relay.

(7) B2 and B8 releasing return the drum motor to normal speed, and as F relay releases F2 and F3 move to upper contacts, applying the excitation for fast spindle speed and carriage jacking up to spindle and carriage couplings respectively.

The system is now in precisely the same state as at the conclusion of the first possible sequence, i. e. spindles turning at fast twist speed, carriage jacking up, and all relays released. Thus, whether drum contact DC2 is made before or after the carriage arrives at the end of its run the result is the same, namely that drum and carriage are brought into step and the cycle is launched into its next phase under identical conditions in both cases.

The cycle of mule operations proceeds as follows:

The fast spindle speed and carriage jacking up continue while the drum turns to its next contact, drum contact DC3 (Fig. 7G). When this contact makes the following events occur:

(1) F relay is excited via drum contact DC3, and locks in via F1, C2. F2 and F3 drop to lower contacts and apply stop excitation to the spindle and carriage couplings. Simultaneously with the closing of drum contact DC3, a pin in another track of the control drum closes drum contact DC8. This energises relay M to close contact M1 and energise a solenoid Sol 6, (Fig. 7P), thereby applying a brake to the tin roller shaft. This brake may be of the same construction as that shown in Fig. 17.

The drum moves on until drum contact DC4 makes, and simultaneously with this, drum contact DC8 is again made by a second pin in the appropriate control drum track, thereby de-energising the relay M and removing the brake from the tin roller. Making of drum contact DC4 pulse excites relay L.

The motor 64 (Fig. 3) for backing-off the spindles and moving the faller and counterfaller to and from their operative positions is associated with two differential gears 111, 112 which are in every respect similar to the differential gear 51 (Fig. 2) for driving the delivery rollers, except that the teeth on the outer member of gear 111 are so shaped that it can be locked against rotation in either direction. This is necessary to enable, as later described, the drive from the motor 64 in both directions to be transmitted to the faller and the counterfaller shafts. These differential gears are associated respectively with pawls 113, 114 which are normally held inoperative by springs (not shown) but can be engaged to lock their respective differential gears by solenoids Sol 4, Sol 5, mounted on the carriage and shown in Fig. 7M. The differential gear 112 (Fig. 3), when locked, is effective to drive the tin roller 21 in reverse for backing-off. The differential gear 111, when locked, is effective to drive the faller shaft 115 and also the counterfaller shaft 116.

The inner side bevel gears of both differential gears 111, 112 are fast to a common sleeve 117 which is free to rotate on the tin roller shaft 118. The sleeve 117 also carries a sprocket 119, which receives the drive via a chain 120 from a sprocket 121 driven by reduction gearing from the motor 64.

The outer side bevel gear of the differential gear 111 is fast to a sleeve 122, which is free to rotate on the tin roller shaft 118, and this sleeve carries a pinion 123, which by engagement with a second pinion 124 drives a short countershaft 125. The outer side bevel gear of the differential gear 112 is keyed to the tin roller shaft 118.

The faller shaft 115 is driven from the countershaft 125 by a belt drive 126. The counterfaller wire 66 is depressed when the faller wire 65 rises to its inoperative position by means of an S-strap 127 connecting members 128 and 129 on the counterfaller shaft 116 and countershaft 125 respectively. When the motor 64 rotates the countershaft 115, in the direction shown by the arrow, to lower the faller wire 65, the S-strap 127 first allows the counterfaller to rise at constant speed until the counterfaller wire 66 comes into contact with the yarns, and then as the countershaft 115 continues its rotation, the S-strap 127 becomes completely slack, leaving the counterfaller wire pressed against the yarns under the influence of the counterweight 130 only. Operation of the counterfaller shaft 116 from the countershaft 125 rather than from the faller shaft 115 itself is preferred, because the former rotates through four times the arc of the latter, and therefore allows a more adequate margin for adjusting the S-strap 127 correctly.

The operation of the system is controlled by means of four micro switches F/S1—F/S4. The switches F/S1 and F/S3 are operated by a projection 131 on the back of the faller leg when the latter falls to its fully disengaged position, i. e. when the faller itself is raised to its inoperative position. The switch F/S2 is operated by the front of the faller leg when the latter falls forward into its operating position on the copping bowl 68, i. e. when the faller has been lowered fully into its operative position and the mule is ready to wind on. The switch F/S4 is a safety switch which fulfils a function described later.

The electrical system, for controlling the excitation of the solenoids Sol 4 and Sol 5, Fig. 7M, and the supply of current to the motor 64, comprises two double acting relays P and R (Fig. 7N), one relay P serving to stop and start the motor as required, and the other R, serving to reverse its direction of rotation.

Figure 7:
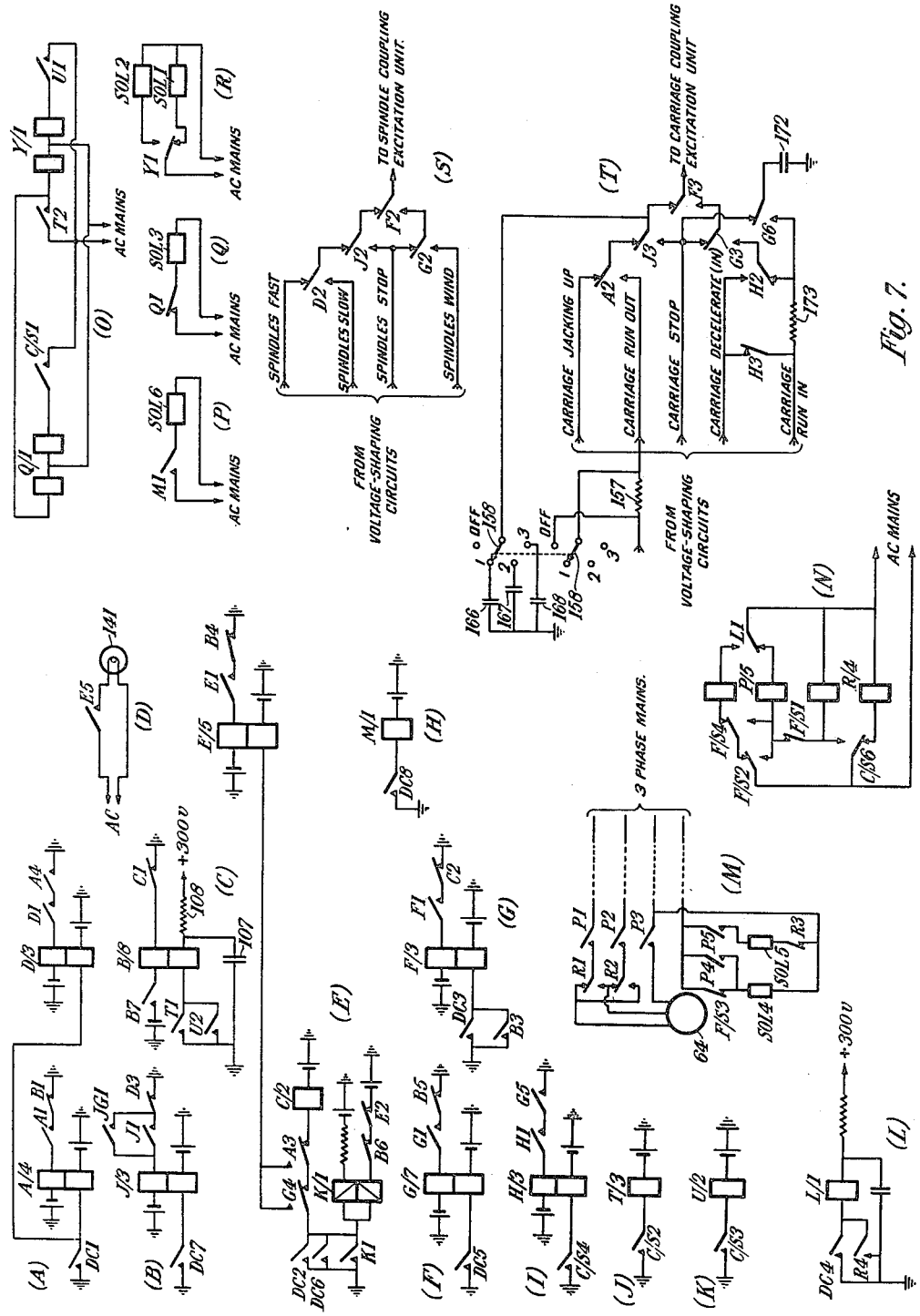

Both Figs. 3 and 7 (M and N) show the parts in the positions they occupy immediately before the start of the backing-off operation. The faller wire 65 (Fig. 3) is therefore up, the counterfaller wire 66 is down, the faller leg 67 is disengaged from the copping bowl 68 and switches F/S1 and F/S3 are operated. Consequently solenoid Sol 4 is energized to lock the differential gear 111.

The backing-off process is initiated by the drum contact DC4 closing and pulsing the relay L (Fig. 7L) as already described. As L1 (Fig. 7N) moves to its upper contact, and theerafter drops back, the upper coil of P relay is excited and P relay pulls over, closing P1, P2 and P3 and starting the motor 64. P4 and P5 also close, P4 shorting out F/S3 which will open as soon as the faller leg 67 begins to rise, and since R3 is closed, both solenoids Sol 4 and Sol 5 are excited, and the pawls 113, 114 lock both differential gears 111, 112. The differential gear 111 drives the countershaft 125 and the faller is lowered and the faller leg raised. At the same time the counterfaller is allowed to rise into contact with the yarns as already described. The differential gear 112 backs off the tin roller 21 and hence the spindles in the direction shown by the arrow.

As soon as the faller leg 67 begins to rise, switches F/S1 and F/S3 open and remain open until the faller leg is lowered again to its inoperative position at the end of the draw. The motor continues to run until the faller leg 67 rises high enough to drop forward into its operative position on the copping bowl 68. As it does so, it operates F/S2 which changes over to its lower contact, and the lower coil of P relay excites and pulls P relay over. P1, P2 and P3 open to stop the motor. P4 and P5 open and deenergise Sol 4 and Sol 5, freeing both differential gears.

The system is now ready to wind on as the carriage runs in. The tin roller 21 can turn freely in either direction since the differential gear 112 is unlocked. The faller shaft 115 is free to follow the movement of the faller leg 67 as it rises and falls on the shaper rail. Movement of the faller shaft will be transmitted back to the countershaft 125 and thence to the sleeve 122 which is free on the tin roller shaft 118, and since differential gear 111 is unlocked, no movement is transmitted through it to the sleeve 117, which is held stationary by the chain 120.

After backing-off has been completed, drum contact DC5 (Fig. 7F) makes, with the following results:

(1) G relay excites and locks in via G1, B5.

(2) G2 and G3 drop to bottom contacts, and since F2 and F3 are also on bottom contacts (F relay is still excited), the spindle coupling is connected via F2, G2 to the excitation voltage for winding on and the carriage coupling to the excitation voltage for running the carriage in. G4 rises to its upper contact, G5 falls to its lower contact and G6, G7 (Fig. 9) move to produce effects in the voltage shaping circuits which will be described later.

The carriage then runs in at constant speed, and the spindles wind the yarn up automatically at the correct rate. As the relay Q is double-acting, actuation of the switch C/S1 by the carriage on the inward run will have no effect on the relay Q or one the solenoid Sol 3 controlled thereby.

As the carriage approaches the end of its inward run, the same position as regards synchronisation occurs as at the end of the outward run. Again there are two possibilities: Either the carriage arrives at the end of its run before drum contact DC6 (Fig. 7E) makes, or vice versa. Both possibilities must, therefore, again be considered. In either case, as the carriage approaches within about a foot of the end of its run, a carriage switch C/S4 (Fig. 7I) is closed by the carriage. This excites H relay, which locks in via H1, G5. H3 contact breaks, and H2 moves to its upper contact. The effect is, as later described, to allow the excitation of the carriage coupling to fall towards stop excitation at a controllable rate, and so to decelerate the carriage as it approaches the end of its run. The position at which deceleration starts is determined by the position of C/S4, which is adjustable, and the rate at which the carriage speed falls can be determined within limits.

The two possibilities at the end of the inward run may now be considered separately as follows: It should be noted that drum contact DC6 is operated by a second contact pin, set in the same track as that which operates drum contact DC2 and suitably spaced from it.

15

(A) Drum contact DC6 (Fig. 7E) makes before the carriage reaches the end of its run.

The following sequence then occurs:

(1) When drum contact DC6 makes, E relay is excited via G4 upper contact and locks in via E1, B4.

(2) Drum contact DC7 (which is always set to operate with drum contact DC6, though occupying a separate track), excites relay J, which locks in via J1, D3. Contacts J2 and J3 drop to lower contacts and prepare stop excitation for both spindles and carriage, to be applied as soon as F relay is released.

(3) E3 closing, stops the control drum driving motor and the drum comes to rest. E2 opening prepares K relay by removing flux from the lower coil, K relay is excited by drum contact DC6, and locks in via K1.

The carriage now runs on until the carriage switch C/S2 (Fig. 7J) makes to excite T relay. Closure of contact T1 pulses B relay, which locks in via B7 and C1. B5 opens to release G relay and E relay releases via B4. As G4 drops to its lower contact C relay is excited, and C1 opening releases B relay. B3 and C2 release F relay, thereby applying stop excitation to the carriage and spindles. B6 closing restores the cancelling flux in K relay lower coil and K relay consequently releases, E relay releasing restores the drum motor to movement speed and as soon as the drum moves on drum contact DC6 breaks and C relay releases.

Closure of contact T2 energises the alternative coil of Y-relay, moving contact Y1 back to the position illustrated and energizing Sol 1 in place of Sol 2, so moving the carriage clutch to the position appropriate for the next outward run. Closure of contact T2 also energises the alternative coil of Q relay, moving contact Q1 back to the position shown and energising Sol 3 to lock the differential gear 51 (Fig. 2) for driving the delivery rollers. Contact T3 (Fig. 8) opens with consequences to be described later.

Shortly prior to arrival of the carriage at the inner end of its run, and therefore prior to closure of switch C/S2, the faller leg 67 (Fig. 3) has begun to be pushed off the copping bowl 68 by the usual faller bracket beside the shaper rail, so causing F/S2 to move to its upper contact and preparing for excitation of the upper coil of P relay. When the carriage reaches the inward end of its run, a carriage switch C/S6 is operated and changes over to its upper contact, thus exciting the upper coil of R relay. R1 and R2 change over and prepare the motor to drive in the reverse direction. R3 opens and holds off the solenoid Sol 5 so that, when started, the motor 64 will not drive the tin roller. R4 closes and pulses L relay again. L1 changes over to its upper contact long enough to excite the upper coil of P relay which starts the motor in reverse via contacts P1, P2 and P3. P4 and P5 close but only Sol 4 operates. Sol 4 locks the differential gear 111 but 112 rmains unlocked, so that the motor 64 cannot turn the tin roller 21. The motor 64 runs in reverse, driving the faller shaft 115 and raising the faller, while the faller leg 67, having been pushed clear of the copping bowl 68 by the faller bracket just previous to the closing of C/S2, descends towards its lowest position. As the countershaft 125 turns through its last few degrees, the member 129 depresses the counterfaller to the inoperative position.

The motor 64 runs until the faller leg reaches its lowest position, when F/S1 and F/S3 close. The lower coil of P relay excites via C/S6 upper and L1 lower contacts and P relay pulls over, stopping the motor. P4 and P5 open, but Sol 4 is, notwithstanding this, energized to lock the differential gear 111 because F/S3 is closed.

The carriage moves out again on the next cycle and immediately as it does so C/S6 is released and changes back to its lower contact. R lower coil is excited and R1 and R2 go to their upper contacts ready to drive the motor in the correct sense for backing-off. R3 closes preparing solenoid Sol 5 for the next operation. R4 opens.

The mechanism shown in Fig. 3 is now in exactly the

16 same state as that from which it started, and remains so during the outward carriage run and the fast twist and jacking-up period. F/S3 is closed and solenoid Sol 4 energised, thus locking the differential gear 111. This acts as a locking device to maintain the faller and counterfaller in their inoperative positions; in order to move, they would have to turn the armature of motor 64 through a 12:1 reduction gear and the other associated gearing, and they are incapable of doing this. The backing-off cycle is re-initiated by drum contact DC4 as already described.

A fourth faller operated switch F/S4 is usd as a safety switch. It is used as a changeover contact as shown, and normally rests on its upper contact. If for any reason, the faller leg 67 fails to fall forward on to the copping bowl 68 at the end of backing-off, and F/S2 is not operated, then the motor 64 will continue to drive the faller leg up and the faller down until a projection 67a on the faller arm operates F/S4, exciting the lower coil of P relay via L1 lower contact and stopping the motor.

As the drum turns from drum contact DC6 to drum contact DC1 (Fig. 7A), which starts the next cycle, only J relay is excited, and this holds J2 and J3 on to their lower contacts, keeping stop excitation on both spindle and carriage couplings, so that neither spindles nor carriage can move until drum contact DC1 makes.

The second possibility at the end of the inward run may now be examined as follows:

(B) Carriage reaches the end of its run before drum contact DC6 (Fig. 7E) makes.

The sequence is then as follows:

(1) Carriage switch C/S2 (Fig. 7J) closes as the carriage arrives at the end of its run. T relay is excited as before, and B relay is therefore pulsed and locks in via B7, C1. T2 changes over the solenoids Sol 1, Sol 2 as before, and energises solenoid Sol 3, closure of carriage switch C/S6 causes the faller and counterfaller to move to their inoperative positions as just described. Contacts B2 and B8 bring the drum motor to full speed and the drum accelerates to close the gap. B6 prepares K relay for excitation by opening the lower coil circuit.

(2) G relay releases via B5. G2 and G3 rise to upper contacts to apply stop excitation to both spindle and carriage couplings. G4 falling to lower contact prepares C relay for excitation by drum contact DC6.

The drum runs on at full speed with the carriage stationary until drum contact DC6 makes. The sequence then continues as follows:

(3) Drum contact DC6 excites C relay via G4 lower contact. Drum contact DC6 also excites K relay, which locks in via K1, and drum contact DC7, which makes simultaneously with DC6, excites J relay, which locks in via J1, D3.

(4) C1 releases B relay. B2 and B8 restore the drum to normal speed. C2 and B3 opening release F relay, and F2 and F3 rising to upper contacts prepare to put spindles slow and carriage run out excitation on to the couplings when J relay releases and D and A relays excite later. B6 closing releases K relay. K1 either releases C relay or prepares it for release when drum contact DC6 opens as the drum moves on. As the drum moves on from drum contact DC6 to drum contact DC1 only J relay is excited.

The final result is thus the same as that which obtains when the first possibility is considered. Further, the state of relays as the drum turns from contact DC6 to contact DC1 is precisely that with which the description commenced. Hence the full cycle of relay operations and their effects has been described.

The above description of the main relay system indicates that jacking-up continues throughout the period while spindles fast excitation is applied to the spindle coupling. It may, however, be desired to terminate jacking-up at an earlier stage, as shown in Fig. 5. Provision for this is made, as later described, by the carriage switch C/S5 (Fig. 9) in the carriage jacking-up excitation circuit.

A switching arrangement for stopping the mule either at the end of the draw or at any instant whatever it may happen to be in the cycle of its operations is shown in Fig. 8.

Four switches are provided, two 132, 133 on the control cabinet, and two 134, 135 mounted at any convenient station on the mule frame close to the operative's hand. The switches 132, 135 are emergency stop switches. If either of these is moved to "Emergency Stop" the mule will stop immediately. The other switches 133, 134 are those normally used for stopping the mule. If either of these switches is moved to "End of Draw Stop" at any time during the cycle, the mule will continue to operate until the end of the cycle is reached, and will then stop with the carriage fully run in.

All four switches are placed in series, and the two "end of draw" switches 133, 134 are short-circuited by the contact T3 which is normally closed, but is opened as already described as the result of closure of switch C/S3 each time the carriage reaches the end of the inward run.

A single coil relay S is excited through all four switches in series, and has four contacts, two, S1 and S2, normally open and two, S3 and S4, normally closed. The two normally open contacts S1 and S2 are wired directly into the field coil circuits of the carriage and spindle couplings respectively, as indicated in Fig. 10 for the case of the carriage coupling, the normally closed contact S3 is in parallel with the drum motor stop contact E3, as shown in Fig. 6 and the normally closed contact S4 applies a brake, 503 Fig. 17, to the slotted disc 71 driven by the drum motor (Fig. 6).

The two emergency switches 132, 135 having been placed at "Restart" and the two normal-use switches 133, 134 at "Start," relay S is energized, and remains energised so long as all switches remain closed. When S relay is excited, contacts S1 and S2 close the coupling field coil circuits, S3 opens and allows the drum driving motor to come to its normal speed and S4 opens to remove the brake from the disc. The mule begins to operate, and continues to do so since contact T3 has no effect, being short-circuited by the two closed normal-use switches.

If at any point in the cycle either of the normal-use switches 133, 134 is turned to "End of Draw Stop," nothing happens immediately, because relay S is maintained by T3, which is closed, but as soon as the end of the inward run is reached and contact T3 opens, relay S releases and the mule stops, holding T3 open. Return of the normal-use switch to "Start" again exsites relay S, and the mule continues.

If at any point during the cycle either of the emergency switches 132, 135 is turned to "Emergency Stop," relay S at once releases and the mule stops. It cannot then be restarted until the emergency switch is restored to the "Restart" position. When this is done the mule continues its cycle from the point at which it stopped.

The machine includes two guard relays. If the 300 volt D. C. power supply to the voltage shaping circuits should fail, the carriage and spindle couplings would at once go to full speed. To prevent this, the 300 volt supply line contains a relay (not shown) which normally holds a contact SG1 closed, as shown in Fig. 8. On failure of the power supply, this relay is de-energised, thereby opening contact SG1 and stopping the machine. The other guard relay (also not shown) safeguards against the possibility of the control drum stopping, in response to actuation of one of the ends of draw switches 133, 134, at some position in which the drum contacts DC6 and DC7 are not made. When either of the switches 133, 134 is moved to its start position, this relay is energised to close a contact JG1 (Fig. 7B) thereby ensuring that J relay will be energised and stop excitation applied to the carriage and spindle couplings until such time as the contact drum has moved to position to close drum contact DC1.

The excitation voltages for the carriage and spindle couplings are generated by the circuits shown in Fig. 9. There are two separate systems of voltage sources, one for the carriage coupling and one for the spindle coupling. In each case the various voltages required are selected by a branching series of relay contacts, A2, J3, F3, G3, H2 and H3, for the carriage coupling and D2, J2, F2 and G2 for the spindle coupling, which are selectively operated by the main relay system in the manner already described with reference to Fig. 7. In both cases the selected voltage is finally led to the grid of a triode valve connected as a cathode follower (136 in the case of the carriage coupling voltages and 137 for the spindle coupling voltages), and consequently appear across the cathode load resistances of these two valves, 138 and 139 respectively. Each of these resistances, as later explained, forms part of the grid circuit of a thyratron supplying the associated coupling field coil with current, and the voltage developed across it therefore controls directly the excitation current in the coupling coil.

Owing to the manner in which the cathode follower load resistances are connected into the thyratron grid circuits, which will be explained later with reference to Fig. 10, voltage changes at the cathode follower grids require to be inverse in character to the coupling field currents, i. e. to increase the field current and hence the coupling speed the cathode follower grid voltage must be lowered not raised. Thus, full speed (1380 revs./min.) of the associated coupling is obtained if a cathode follower grid is brought to earth potential (zero volts), and the coupling stops rotating when the cathode follower grid is raised to approximately +100 volts (the exact value depending to a slight extent on the load on the coupling). Between these extremes, a linear relation exists between coupling output speed and cathode follower grid voltage. If it is required to stop the coupling immediately, the cathode follower grid is best taken to some positive voltage in excess of 100 volts—say about +120 volts. This cuts the coupling field current at once to the stop value, and the coupling slows down as fast as friction and inertia permit.

During the mule cycle, four main excitation voltages are required for the carriage coupling. These are, in the order required, (1) Excitation for the outward run.
(2) Stop excitation at the end of the outward run.
(3) Excitation for jacking-up while the spindles twist up the yarn at high speed.
(4) Stop excitation again while the spindles back off.
(5) Excitation for the inward run.
(6) Stop excitation again for the period between cycles.

On the outward run, the mule carriage starts moving at constant speed (apart from an initial acceleration period). This speed must be controllable at will. At a certain point in the outward run (which must be variable at will) the speed commences to decrease at a rate which also must be controllable, until at the end of the run the speed has fallen to zero. These three variables, initial speed, point of deceleration and rate of deceleration, must be individually variable, and must not be interdependent, i. e. variation of one must leave both the others unchanged, and this must be true for all three of them. Further, it is at once plain that mishandling of such controls must not be allowed to result in the carriage stopping somewhere on the outward run, because, since the synchronising relay system will stop the control drum if the carriage does not arrive, the whole mule would then come to a standstill. Provision is therefore made that if the controls are mis-set in this manner, the carriage speed on deceleration will fall only to some predetermined low value (termed the crawler speed) and the carriage will thereafter move out at this low speed until eventually it reaches the end of its run, and the cycle can proceed. Meanwhile the synchronisation indicator lamp 141 (Fig. 7D) will have given warning that the controls are very badly set.

The circuit for producing the carriage run out controlling voltage operates in the following manner: the numeral 140 is a triode connected as a conventional cathode-coupled Hartley oscillator, and serves as a local oscillator generating an A. C. voltage at approximately 1500 cycles/sec. The output from the cathode of valve 140 is coupled direct to the grid of 142, a second triode functioning as a cathode follower buffer stage isolating the oscillator from the grid circuit of an amplifier 143, triodes 140 and 142 being illustrated conventionally as both contained in the same envelope. Part of the oscillator output is taken from the cathode load of valve 142 and applied via condenser 144 across the rheostat 110. This, as already described, is adjusted by the sector 78 (Fig. 4) on the control drum which is brought into engagement with the idler 109 at a predetermined point in the revolution of the control drum and is thereafter effective to adjust the rheostat 110, through the agency of the deceleration pinion 145, which is coupled to the slider 146 of the rheostat 110 and meshes with the pinion 109. Since the number of teeth on the sector 78 is exactly equal to the number of teeth on each of the pinions 109, 145, the slider 146 is rotated through exactly one revolution at each revolution of the drum, and returned to its original position ready for the next operation. As the slider 146 is rotated by the sector 78, a gradually increasing voltage at 1500 cycles/sec. is applied to the grid of the amplifier valve 143. This voltage reaches a maximum as the slider 146 reaches the upper end of the rheostat 110 and returns sharply to zero as it crosses the gap between the ends of the rheostat. (In general, the operation of decelerating the carriage will be concluded before the slider has completed its revolution. Only a portion of the complete revolution is utilised before the relay system transfers the coupling excitation to another circuit. The slider then completes its revolution and resets without affecting the operation of the carriage any further).

The A. C. voltage applied to the grid of 143 by the rheostat 110 is amplified and stepped up by the anode transformer 147 so that approximately 400 volts are available across the secondary of 147. This secondary is connected in circuit with a potentiometer 148.

A diode 149 rectifies the potential picked up by the slider 150 of the potentiometer and applies across a resistance 151 a D. C. potential determined by the position of the slider 150. The resistance 151 is connected between the anode of a diode 152 and the slider 156 of a variable resistance 153. Hence the anode of diode 152 will be driven positive to the slider 156 by an amount which varies with the setting of the slider 150, every time the slider 146 is rotated by the sector on the control drum.

The resistance 153 forms part of a potentiometer chain 154, 155, 153 connected between the stabilised +300 volt line and earth. Hence, there exists between the slider 156 and earth a positive potential variable in magnitude by the position of the slider 156.

Consider now the circuit from the grid of valve 136 via F3 upper contact, J3 upper contact, A2 lower contact, a resistance 157ª (shorted out when a slow start switch 158 is in the "off" position), and resistances 151, 153 to earth. The control voltage applied to the coupling excitation unit will be the algebraic sum of all D. C. voltages in this circuit, and therefore, when slider 146 is resting at its zero position and no voltage is applied to the grid of valve 143, it will consist only of the voltage across the lower half of 153. This voltage therefore determines the velocity with which the carriage commences its outward run, and slider 156 is the "Initial Speed" control of the carriage. The range covered by 156 can be set by means of 154, which is screw driver set from within the cabinet. As soon as the sector picks up the slider 146 and commences to turn it, a voltage begins to appear across 151, and increases at a rate dependent on the setting of slider 150. This voltage adds to that already present in the grid circuit of valve 136, and drives the grid of 136 more positive which, as already explained, slows the coupling down so that the carriage decelerates. The rate of deceleration depends on the rate of build-up of the D. C. voltage across resistance 151, which is governed by the setting of slider 150. The latter therefore constitutes the "Rate of Deceleration" control for the carriage. It should be noted that the adjustments of sliders 150 and 156 are quite independent. The initial speed can be varied at will without affecting the rate of deceleration, and vice versa; and since the point in the outward run of the carriage at which deceleration starts is determined by the point at which slider 146 begins to rotate, and this in turn is set by the position of the sector on the control drum, the onset of deceleration can also be varied without affecting either the rate of deceleration or the initial carriage speed.

The necessary safeguard against premature stoppage of the carriage is provided by the low-impedance diode 152, whose cathode is maintained at approximately +80 volts by connection to the slider 157 of resistance 165, which forms part of a potentiometer chain 165, 159, connected across the voltage stabiliser 160. The cathode potential of 152 can be varied over a small range (approximately 10 volts) by adjustment of resistance 165. As soon as the upper end of 151 tends to be driven more positive than 80 volts, the diode 152 conducts, since its anode is swung positive to its cathode, and the diode current passing through 151 in the reverse sense sets up a counter-voltage which exactly offsets the tendency of the anode of 152 to rise above 80 volts. The diode 152 thus clamps the grid of valve 136 to an upper limit of about 80 volts positive, which value can be adjusted by means of the slider 157. This reduces the carriage coupling speed to a low value, termed the crawler speed, below which it cannot fall. The slider 157, which is screw driver set from within the cabinet, thus constitutes the "Crawler Speed" control of the carriage.

The purpose of the shunt resistance 161 is as follows: When the slider 146 is turned at constant speed by the control drum, it produces a deceleration of the carriage which is a linear function of time. The shunt resistance 161 modifies the deceleration of the carriage so that it is non-linear with respect to time.

When it is desired to stop the carriage, the coupling is de-excited by connecting the grid of valve 136 to a point whose potential is more than 100 volts positive to earth. The stop voltage is derived from a simple potentiometer chain 162, 163, 164 across the 300 volt H. T. line and earth, the junction of 162 and 163 being the required point at +120 volts. To stop the carriage therefore, the grid of 136 is connected to this point via F3 upper contact, J3 lower contact, under control of the main relay system.

It is sometimes desirable that the carriage shall move away from rest on the outward run with comparatively low acceleration. To effect this as required, the switch 158 (see also Fig. 7) is used to introduce a condenser-resistance delay into the build-up of excitation voltage for the outward carriage run. The resistance 157a is short-circuited in the "off" position of the slow start switch 158. In the second, third and fourth positions of the switch, corresponding to three different starting accelerations, condensers 166, 167, 168 of different capacities are connected between the upper F3 contact and earth and the resistance 157a is unshorted. The run out excitation to the carriage coupling cannot then build up faster than the condenser in use can charge through the high resistance.

When the carriage is travelling in, it is not subjected to a controlled deceleration brought about by a sector and rheostat as in the case of the outward run; nevertheless, it is advisable to decelerate it fairly sharply near the end of its inward run, in order to avoid any bump or crash when the end of the line is reached. This is effected by the relay contacts H2 and H3 via the "carriage decelerate" line and the resistance-condenser combination 169, 170. When the carriage is about a foot from the end of its inward run, it closes the switch C/S4 which operates H relay as already described, thereby opening H3 and changing over H2. For the run-in, the carriage excitation is derived from resistance 171 via H2 lower, G3 lower, F3 lower contacts. A condenser 172 is charged through G6, upper contact, prior to the start of the run in. When G3 and G6 move to their lower contacts to apply the carriage run in excitation to the carriage coupling, the charge on condenser 172 applies to the grid of valve 136 a voltage additional to that derived from resistance 171. This gives a slow start to the run in, the carriage gradually accelerating as the charge on condenser 172 leaks away through resistances 173, 171. During the run in, H3 is closed and the condenser 170 is kept charged to the difference in potential between the junction of resistances 163, 164 (+85 volts) and the slider of resistance 171 (about +10 volts). When H relay operates, the grid of valve 136 is connected, by movement of H2 to its upper contact, via the charged condenser 170 to a point which is at very nearly stop voltage for the carriage coupling. The immediate change in voltage at the grid of valve 136 is zero, because H2 has merely transferred it from one point to another which, an instant before, was at the same potential, because H3 was closed. When H3 opens, however, the charging circuit for condenser 170 is broken, and the condenser discharges through resistance 169 at a rate dependent upon the setting of the latter. As it discharges, the grid of valve 136 is carried upwards towards stop voltage. The carriage decelerates, and when finally full stop excitation is applied by G3 changing over, it has come substantially to rest.

The point at which carriage deceleration on the inward run commences is determined by the position of the carriage switch C/S4, which is movable within limits. The rate of deceleration is variable by alteration of resistance 169, which varies the time-constant of the combination 169, 170 from about 1 second downwards. These two adjustments suffice to ensure a smooth, steady and adjustable deceleration at the end of the inward run.

The coupling excitation for the jacking-up period lies very near the stop voltage. It is derived from the potentiometer chain 174—177 and is applied to the grid of valve 136 via A2 upper, J3 upper, F3 upper contacts. The adjustment of resistance 176 varies the jacking-up excitation and hence the rate of jacking-up, and 176 constitutes the "Jacking-up Speed" control for the carriage. The range covered by 176 can be set by means of 174, which is screwdriver set from within the control cabinet. The extent of the jacking-up movement of the carriage is determined by a switch C/S5. When actuated by the carriage this switch removes a short circuit from a resistance 178 in series with the potentiometer chain 174—177, thereby raising the voltage applied to the grid of valve 136 to the stop value.

Carriage excitation for the inward run is derived, as mentioned above, from the resistance 171 which, with resistance 179, forms a simple potentiometer chain. The speed on the inward run can be varied by adjusting 171. This adjustment is screw-driver set from within the cabinet, since it is not normally required to vary the speed of the carriage on the run-in. Generally speaking the aim is to run the carriage in as fast as possible, consistent with smooth operation, satisfactory winding of the yarn on to the cops and good cop building.

The individual excitation voltages required by the spindle coupling during the mule cycle are as follows:

(1) Excitation for slow twist (drafting twist) during the outward carriage run.

(2) Excitation for fast twist (spinning twist) while the carriage is standing at the outward end of its run, or moving in during jacking up.

(3) Excitation for variable speed during the inward carriage run, to wind the spun yarn on to the cops.

(4) Stop excitation, for the period between cycles, and during the backing-off operation which, as already described, is performed by the motor 64 (Fig. 3) and not by the spindle coupling.

As the carriage moves out, the spindles revolve at constant speed, and in general continue to do so until the carriage reaches the end of its outward run. The spindle speed during this period must be made variable over a fairly wide range, in order that the correct amount of drafting twist may be inserted into the yarn (approximately 2½ turns per inch) whether the carriage moves out rapidly or slowly.

The necessary excitation voltage is derived from resistance 182 in the potentiometer chain 180—183, and is applied to the grid of valve 137 via D2 lower, J2 upper F2 upper contacts. The resistance 182 constitutes the "Slow Twist" control for the spindle coupling.

Occasionally it is required that the spindle speed should begin to increase towards the fast twist speed, a change which normally occurs only after the carriage reaches the outer end of its run, while the carriage is still running out. Provision is made for this requirement by means of the rheostat 181 and its associated short-circuiting switch 184. During normal operation, 181 is shorted out by placing the switch 184 in the Off position, and so does not affect the potentiometer chain voltages in any way. When the switch 184 is turned to On, 181 is unshorted. Its slider 185 is driven by the sector 79 (Fig. 4) on the control drum, in exactly the same way as the slider 146 of the deceleration rheostat 110 already described in connection with the carriage coupling excitation. The sector 79 is set to engage and commence to turn the slider 185 at any desired point towards the end of the outward carriage run; as it turns, the total resistance to the left of 182 increases from 34,000 ohms to 84,000 ohms, while the total resistance to the right of 182 remains unaltered. As a result, the spindle speed increases proportionately, whatever value it may have been set to originally.

Spindle excitation for fast twist is derived from the simple potential divider 186, 187, and applied via D2 upper, J2 upper, and F2 upper contacts. The maximum spindle speed available is that corresponding to full excitation of the coupling, and is about 1380 revs./min. on the tin roller shaft, or 5520 revs./min. on the spindles assuming no slip in the spindle bands. The resistance 187 is the "Fast Twist" control for the spindle coupling. The coupling accelerates very rapidly when full excitation is applied. It is desirable to stop the spindles rapidly, when stop excitation is applied prior to backing off and the electrically-operated friction brake (similar to brake 503 shown in Fig. 17), is then applied by the solenoid Sol 6 to the tin roller shaft, as described above, since the magnetic slip couplings herein referred to have no dynamic braking effect.

As the carriage runs in, the spindle speed must be made to vary in a somewhat complex manner, so as to wind up the length of yarn extending from the cop to the nip of the delivery rollers evenly as the winding faller rises and falls to shape the cop. This is accomplished by causing the spindle speed to vary with the position of the counterfaller shaft 116 (Fig. 3). The latter as indicated in Fig. 9 is geared by 5:1 step-up gears 116a, 188a, to the shaft of the slider 188 of a rheostat 189, which forms part of the potentiometer chain 190, 189, 1891. As the counterfaller shaft 116 rotates, the slider 188 moves over an arc equal to five times that of the counterfaller shaft, and so varies the voltage applied to the grid of valve 137 via G2 lower, F2 lower contacts.

The spindles wind excitation circuit embodies an anti-hunting circuit and a backing-off compensation circuit which will now be briefly described.

The variable D. C. voltage picked off by the slider 188 is applied to the grid of a valve 291. From a variable resistance 192 in the anode circuit of this valve a signal of reduced amplitude and 180° out of phase with the grid signal is applied to the grid of a valve 193. The variable D. C. voltage at the slider 188 is also applied directly, via a resistance 194 to the grid of a cathode follower valve 195, and thence to the grid of valve 137. As the amplifier 291, 193 is resistance-capacity coupled it will not respond to slow variations in D. C. potential of the slider 188; but rapid changes in D. C. potential of 188 will be impressed via condenser 196 on the grid of valve 195. There is thus added to the original D. C. signal a term whose magnitude depends on rate of change of the angular position of the counterfaller shaft and this serves to eliminate hunting due to time lags in the speed control mechanism.

In Fig. 15 the curve OABC represents approximately the ideal spindle speed (i. e. the spindle speed required for conformity with the above stated desirable condition) for the case of winding on empty tubes in a particular mule. The curve ODEBC represents approximately the ideal spindle speed when winding on full diameter cops. Over the range OE the faller is traversed downwardly by the shaper rail and over the range EC it is traversed upwardly.

If the spindle speed selected as the result of the position occupied by the counterfaller at the start of the run in is zero a very sharp upward movement of the counterfaller would be necessary to accelerate the spindles to the speed AB, in the case in question 1274 R. P. M. This would result in inertia hunt. If, to overcome this, the initial spindle speed were set at 1000 R. P. M., all would be well when winding on empty tubes. However when winding on full cops the spindle speed at point D is only 415 R. P. M., and a large reduction of the spindle speed would be required at the start of the run in.

Selection of an intermediate initial spindle speed of 500–600 R. P. M. would solve the difficulty, but the position of the counterfaller shaft after backing-off varies with the state of formation of the cop. The angle through which the counterfaller shaft will rotate during backing-off, and consequently the speed imparted to the spindles at the beginning of the inward run, is therefore unpredictable and inconstant. Accordingly if the initial spindle speed is to be made constant, as is clearly very desirable from the point of view of minimising hunting, a special device is required to make it so.

The backing-off compensator is provided to ensure that the initial speed of the spindles at the start of the inward run will be the same irrespective of the position assumed by the counterfaller shaft after backing-off.

It comprises resistances 197—200, a condenser 201 and the contact G7 of G relay. Immediately after backing-off and before G relay is excited to initiate the run in by dropping G2 on to its lower contact, the cathode of valve 195 will be at substantially the same potential as the slider 188, and the condenser 201 will be charged, via G7 lower contact, to the difference between the control potential at slider 188 and the contact potential at the slider of 198. The spindles will therefore always start at the same speed but thereafter the speed of the spindles is controlled by the counterfaller through the agency of the slider 188.

As the carriage runs in the charge on 201 leaks away as indicated by FG (Fig. 15) the control of spindle speed being effected by the counterfaller once the inward run has started.

Stop excitation for the spindle coupling is derived from the simple potential divider 202, 203, and is applied via G2 upper, F2 lower contacts.

Fig. 10 shows, as a simplified circuit diagram, how the various excitation voltages are supplied to the coupling for driving the carriage. The circuit shown is a modification of a standard excitation circuit for the magnetic slip coupling shown in Fig. 13.

Current for the coupling field coil 204 is provided by connecting the field coil in series with a thyratron 205, on the cathode side, the power supply being single-phase A. C. at 200–250 volts derived from an isolating transformer 206 and being applied when the contact S1 is closed. The thyratron 205 acts as a half-wave rectifier, so that the current in the field coil 204 is half-wave rectified and unsmoothed D. C. A thyratron 207 is connected as a power diode across the field coil 204, in order to short-circuit the back E. M. F. of self-induction when the voltage wave applied to 205 falls to zero. A small resistance 208 is included in the anode-cathode circuit of 207, in series with the field coil 204, in order to prevent the instantaneous current through 207 from rising to too high a value. It also serves, incidentally, to lower the time-constant of the field coil inductance and so increases the rate of response of the whole system to rapid changes in control voltage.

The grid circuit of 205 consists of resistors 209, 210, 211, 212, earth-earth 138. The resistance 212 forms the anode load of a pentode 214 and normally has across it a voltage drop of approximately 100 volts of the indicated polarity, due to the flow of anode current in 214. The pentode 214 is supplied from a rectifier 215 with an anode-cathode voltage stabilized by a diode 216. Across 211 appears a monitoring feed back derived from the A. C. voltage generator 26 already referred to. After rectification by a rectifier 217, the voltage developed by the generator 26, which varies with the speed of the coupling, is applied as a D. C. potential difference of the indicated polarity across 211. Of the total voltage so appearing a certain proportion, depending upon the setting of the slider associated with 211, is included in the grid circuit of 205. The resistance 210 forms part of a phase-shifting network 218 supplied with A. C. at mains frequency by a transformer 219, and enables an alternating voltage out of phase with the anode alternating voltage to be applied in series with the voltages applied to the grid of 205. The resistance 209 is partly a grid-current limiting resistance, to prevent the grid current of 205 from rising to too great a value, and partly a grid bias resistance, in that a D. C. potential is generated across it by the flow of grid-current. Although the grid current flows only during positive half-cycles of anode voltage, the condenser 220 acts as smoothing condenser for the half-wave rectified grid-current, and so gives a fairly steady value to the D. C. grid-bias potential.

In the known excitation circuit, the cathode follower valve 136 and resistance 138 are omitted, the point 221 is not earthed and a slider connects the point 222 to the resistance 212. The excitation current in the coupling coil 204 is then determined by manual adjustment of the slider. Also, in the known excitation circuit the power for valve 205 is derived direct from the mains and not through an isolating transformer.

The cathode follower valve 136 is that shown in Fig. 9 and constitutes, as previously explained, the final output valve of the voltage shaping circuits for the carriage coupling, the various shaped voltages being supplied to its grid as already described. The earth connection at 221 completes the circuit to the grid of valve 205 and includes the control voltages developed across resistance 138 in said circuit. One end of 138 must, of course, be at earth potential if the cathode follower is supplied from a D. C. rectified and smoothed supply with negative earthed.

It has already been explained that, if the grid of 136 is driven more than about 100 volts positive to earth, the excitation voltage is completely cut off from the carriage coupling. This is because, in these circumstances, the voltage drop across 138 will reach 100 volts and exactly offset the voltage drop across 212. The grid voltage of 205 then consists of the voltage across 209 and the phase-shifted alternating voltage across 210. There will be no voltage across 211 because the coupling output will be at zero speed. The grid-bias voltage on 209 makes the grid of 205 sufficiently negative to limit the field coil current to about 80 milliamps, a value too small to excite the coupling, which accordingly does not rotate its output shaft.

If now the grid voltage of 136 is reduced, the voltage drop across 138 will be reduced and the voltage drop across 212 will not be completely offset. The grid of 205 therefore tends to be swung from the slight negative value, referred to above, to a large positive value, due to the inclusion of more and more of the voltage drop down 212 in the grid circuit of 205. As the grid of 205 becomes more positive, however, the field coil current of the coupling rises and the coupling commences to rotate its output shaft, with the result that the rectified voltage from generator 26 begins to build up across 211 and since the latter is in series opposition to the drop in 212, it offsets the latter to a considerable extent.

Even therefore when the voltage drop across 138 is reduced to its minimum value of about 5 volts, by earthing the grid of 136 (the condition for maximum speed of the coupling), thereby including substantially the full 100 volts drop across 212 in the grid circuit of 205, by that time the A. C. voltage of generator 26 (approximately 2 volts R. M. S. per 100 revs./min. output speed) has reached 28 volts R. M. S. very approximately, and this voltage after transformation and rectification offsets most of the positive voltage introduced by 212 into the grid circuit of 205. (The alternating voltage across 210 does not vary at all, and the grid-bias voltage across 209 increases only slightly as the coupling speed increases.) The grid of 205 is therefore driven more positive as the speed is increased by 212, but not to the extent of 100 volts or anything like it; indeed the average D. C. level of the grid of 205 is never raised more than a few volts above zero even at full excitation. The speed-stabilising action of the voltage developed by the generator 26 can now be clearly appreciated, for if the coupling output speed for any reason falls, the opposing voltage across 211 at once decreases, allowing 212 to raise the grid voltage of 205 and so by increasing the field current in the coupling, restore the output speed to its original value. The sensitivity of control is set by the slider of 211, and is normally arranged to be as great as possible, consistent with non-hunting of the control system as a whole.

A precisely similar circuit to that shown in Fig. 10 is used for applying to the field coil of the spindle coupling the control voltages derived from the cathode of the valve 137.

Figs. 11 and 12 show an alternative arrangement for backing off. In this arrangement discs 223, 224, mounted respectively on the faller shaft 115 and on the counterfaller shaft 116, are brought at the end of the inward run of the carriage as shown in Fig. 11, into engagement with a friction plate 225, mounted for rotation on the machine frame 225a and maintained continuously in rotation by an electric motor 226 through the agency of a chain drive 227, a gear box 228 and a chain drive 229. The plate 225 turns in the direction of the arrow and is then effective to rotate the discs 223, 224 in the directions shown in Fig. 11, thereby rotating the faller shaft 115 and counterfaller shaft 116, against the action of their respective counterweights 230, 130 to move the faller and counterfaller to their inoperative positions. Flates 231, 232 are provided on the discs 223, 224 corresponding to the inoperative positions of the faller and counterfaller and rollers 233, 234 on the discs 223, 224 thereafter take up the drive from the friction plate 225, turning idly as they do so. The faller and counterfaller are locked in their inoperative position (shown in Fig. 11) by the engagement of pawls 235, 236 with pins 237, 238 on the discs 223, 224. The pawls 235, 236 are fixed to a shaft 239, which is mounted in brackets 239a on the carriage. The shaft 239 carries an arm 240, loaded by a spring 241 which urges the pawls 235, 236 to operative position. A solenoid Sol 7, on the carriage, when energised, is capable of attracting a rod 242, attached to the arm 240, and so freeing the pawls 235, 236 from the pins 237, 238.

A sprocket 243 on the faller shaft 115 is connected by a chain 244 to the input sprocket 245 of a torque amplifier 246. This is of the capstan type, described at page 17 of "An Introduction to Servo-Mechanisms" by A. Porter, published by Methuen & Co. Ltd., London, 1950. The output sprocket 247 of the torque amplifier is connected by a chain 248 to a sleeve similar to the sleeve 117 (Fig. 3) of a differential gear similar to the differential gear 112 for imparting backing off movement to the tin roller. This differential gear is controlled by the solenoid Sol 5 (Fig. 12) and is locked only during the backing off operation.

Fig. 12 shows the modification to the main relay system (Fig. 7) required when the backing off system of Fig. 11 is used. The relay G is provided with an extra contact G8 and relay L is operated only by the drum contact DC4, as shown. When drum contact DC4 makes, as already described, after conclusion of spinning the relay L is excited and locks in via contacts L1, G8. Contact L2 closes to energise the solenoids Sol 5 and Sol 7. Sol 5 locks the differential gear 112 (Fig. 3) for imparting backing off movement to the tin roller and Sol 7 frees the pawls 235, 236 (Fig. 11) to allow the faller and counterfaller to swing into operative position under the action of their respective counterweights 230, 130. In doing so, the faller shaft 115 imparts backing off movement to the tin roller through the agency of the torque amplifier 246 and the locked differential gear 112.

When, thereafter, the drum contact D. C. 5 makes to energise G relay, the contact G8 opens, thereby releasing L relay and de-energizing solenoids Sol 5 and Sol 7. The differential gear 112 is thus freed and Sol 7 releases the pawls 235, 236 so that they may lock the faller and counterfaller when they are again moved to inoperative position by the friction plate 225 at the end of the next inward run of the carriage.

What we claim as our invention and desire to secure by Letters Patent is:

1. In a spinning mule, the combination, with spindles and a carriage, of a variable speed spindle driving mechanism, a variable speed carriage driving mechanism, each of said driving mechanisms comprising a prime mover and a magnetic slip coupling, a timing control member, means for moving the latter cyclically during the operation of the mule, contacts closed by said control member at different points in its travel, an electrical control system comprising a plurality of voltage shaping circuits, and means for selectively supplying excitation from said voltage shaping circuits to said slip coupling upon the closing of said contacts.

2. In a spinning mule, the combination, with spindles and a carriage, of a variable speed spindle driving mechanism, a variable speed carriage driving mechanism, a timing control member, means for moving the latter cyclically during the operation of the mule, contacts closed by said member at different points in its travel, switches actuated by the carriage at different points in its travel, relays actuated by the operation of said contacts and switches, and control circuits associated with said relays for controlling said driving mechanisms and producing required variations of the speed of the spindles and carriage.

3. In a spinning mule, the combination, with spindles and a carriage, of a variable speed spindle driving mechanism, a variable speed carriage driving mechanism, a timing control member, means for moving the latter cyclically during the operation of the mule, said member having a plurality of zones each corresponding to a separate function of the mule and extending in the direction of travel of said member, contacts extending from different zones at points in the lengths thereof corresponding to required changes of function of the mule, stationary contacts engaged by said control member contacts when reached during the travel of the said member, carriage-actuated switches, and means comprising control circuits rendered operative by the actuation of said contacts and switches for controlling the timing of various mule functions and the speeds of said driving mechanisms during the performance of such functions.

4. In a spinning mule, the combination, with spindles and a carriage, of a variable speed spindle driving mechanism, a variable speed carriage driving mechanism, a timing control member, means for moving the latter cyclically during the operation of the mule, said member having a plurality of zones each corresponding to a separate function of the mule and extending in the direction of travel of said member, contacts adjustable in position lengthwise of said zones to extend therefrom at points in the lengths thereof corresponding to required changes of function of the mule, stationary contacts engaged by said control member contacts when reached during the travel of said member, and an electrical control system rendered successively and selectively operable upon the engagement of said control member and stationary contacts for controlling the timing of various mule functions and the speeds of said driving mechanisms during the performance of such functions.

5. In a spinning mule, the combination of a carriage movable to make outward and inward runs, delivery rollers, a carriage-driving mechanism, means, including an electrically controllable coupling, for driving said delivery rollers from said carriage driving mechanism, a switch operable by said carriage when it reaches the end of its inward run for operating said coupling to start the rotation of said rollers at the start of the outward run of the carriage and a second switch operable by the carriage at a predetermined adjustable point in the outward run of the carriage to operate said coupling to stop said rollers.

6. In a spinning mule, the combination of a carriage movable to make outward and inward runs, a variable speed mechanism for driving the same, comprising a prime mover and a magnetic slip coupling, a timing control member, means for moving the latter cyclically during the operation of the mule, contacts actuated by said control member at different points in its travel, voltage shaping circuits for controlling the carriage, comprising one for the outward run, one for the inward run, and one for applying stop excitation to said coupling, and means for selectively applying excitation from said voltage shaping circuits to said coupling upon the actuation of said contacts.

7. In a spinning mule, the combination of a carriage movable to make outward and inward runs, a variable speed mechanism for driving the same, comprising a prime mover and a magnetic slip coupling, a timing control member, means for moving the latter cyclically during the operation of the mule, contacts actuated by said control member at different points in its travel, voltage shaping circuits for controlling the carriage, comprising one for the outward run, one for the inward run, one for applying stop excitation to said coupling, and one for applying jacking-up excitation to said coupling, and means for selectively applying excitation from said circuits to said coupling upon the closing of said contacts.

8. In a spinning mule, the combination of a carriage movable to make outward and inward runs, a variable speed mechanism for driving the same, comprising a prime mover and a magnetic slip coupling, a timing control member, means for moving the latter cyclically during the operation of the mule, contacts closed by said control member at different points in its travel, an electrical control system comprising a plurality of voltage shaping circuits, one of the same being a jacking-up speed excitation circuit, means for applying excitation from said last named circuit to said coupling upon the closing of one of said contacts, and means including an adjustably positioned carriage-operated switch for determining the extent of such application.

9. In a spinning mule, the combination of a carriage movable to make outward and inward runs, a variable speed mechanism for driving the same, comprising a prime mover and a magnetic slip coupling, a timing control member, means for moving the latter cyclically during the operation of the mule, contacts closed by said control member at different points in its travel, an electrical control system comprising a plurality of voltage shaping circuits, one of the same being a carriage run-in speed excitation circuit, means for applying excitation from said last named circuit to said coupling upon the closing of one of said contacts, at the appropriate time, and means, including an adjustably positioned carriage-operated switch, for modifying said last named circuit to supply decelerating speed excitation to said coupling near the end of the inward run of the carriage.

10. In a spinning mule, the combination of a carriage movable to make outward and inward runs, a variable speed mechanism for driving the same, comprising a prime mover and a magnetic slip coupling, a timing control member, means for moving the latter cyclically during the operation of the mule, contacts closed by said control member at different points in its travel, an electrical control system comprising a plurality of voltage shaping circuits, one of the same being a voltage shaping circuit for controlling the speed of the carriage during its outward run, means for applying excitation from said last named circuit to said coupling upon the closing of one of said contacts, said circuit including means for varying the voltage output thereof, and means including a member movable with said timing control member, operable at a predetermined point in the travel of said control member, to render said voltage varying means effective and thereby to supply decelerating excitation to said coupling towards the end of the outward run of the carriage.

11. In a spinning mule, the combination of a carriage movable to make outward and inward runs, a variable speed mechanism for driving the same, comprising a prime mover and a magnetic slip coupling, a timing control member, means for moving the latter cyclically during the operation of the mule, contacts closed by said control member at different points in its travel, an electrical control system comprising a plurality of voltage shaping circuits, one of the same being a voltage shaping circuit for controlling the speed of the carriage during its outward run, means for applying excitation from said last named circuit to said coupling upon the closing of one of said contacts, said circuit including means for varying the voltage output thereof, and means including a member movable with said timing control member, operable at a predetermined point in the travel of said control member, to render said voltage varying means effective and thereby to supply decelerating excitation to said coupling towards the end of the outward run of the carriage, said outward-run speed controlling circuit including manually-adjustable means for varying the initial voltage output of said circuit and thereby determining the initial speed of the carriage on its outward run.

12. In a spinning mule, the combination of a carriage movable to make outward and inward runs, a variable speed mechanism for driving the same, comprising a prime mover and a magnetic slip coupling, a timing control member, means for moving the latter cyclically during the operation of the mule, contacts closed by said control member at different points in its travel, an electrical control system comprising a plurality of voltage shaping circuits, one of the same being a voltage shaping circuit for controlling the speed of the carriage during its outward run, means for applying excitation from said last named circuit to said coupling upon the closing of one of said contacts, said one circuit including manually adjustable means for varying the initial voltage output of said circuit and thereby determining the initial outward-run carriage speed, and including a separate means for varying the voltage output of said circuit progressively, means including a member movable with said timing control member, operable at a predetermined point in the travel of said control member to render said last named voltage varying means effective and thereby to supply decelerating excitation to said coupling, and manually adjustable means also included in said one circuit for determining the rate of deceleration excitation supplied to said coupling.

13. In a spinning mule, a combination as claimed in claim 12, wherein said one voltage shaping circuit includes means for limiting to a predetermined value the decelerating excitation which said circuit may apply to said coupling.

14. In a spinning mule, the combination of spindles, a carriage arranged to make outward and inward runs, a variable speed driving mechanism for the spindles, comprising a magnetic slip coupling, means for driving said carriage at appropriate speeds, electrical control means capable of producing various voltages, timing means, and means controlled by said timing means at the beginning of the carriage outward run for supplying excitation from said electrical control means to said coupling suitable to drive said spindles at desired speeds during the outward run, and means controlled by said timing means during the inward run for supplying excitation from said electrical control means to said coupling suitable to provide spindle winding speed.

15. In a spinning mule, the combination of spindles, a carriage arranged to make outward and inward runs, a variable speed driving mechanism for the spindles, comprising a magnetic slip coupling, means for driving said carriage at appropriate speeds, a series of voltage shaping circuits, a cyclically movable timing control member, contacts actuable by said timing control member at different points in its travel, switches actuated by the carriage during its travel, and relays actuated by the operation of said contacts and switches, said voltage shaping circuits being associated with said relays to be rendered successively operative to apply suitable excitations to said coupling to suitably vary the spindle speed during the outward and inward carriage runs.

16. In a spinning mule, the combination of spindles, a carriage movable in outward and inward runs, a variable speed driving mechanism for the spindles, comprising a magnetic slip coupling, a timing control member, means for moving the same cyclically during the operation of the mule, contacts actuated by said control member at different points in its travel, voltage shaping circuits for controlling the spindle speed, including a spindles stop circuit, a spindles slow circuit, a spindles fast circuit, and a spindles wind circuit, and means for selectively applying excitation from said circuits to said coupling upon the actuation of said contacts, said spindles slow excitation being thus applied during the outward run of the carriage, said spindles fast excitation being thus applied after the end of the outward run and said spindles wind excitation being thus applied during the inward run of the carriage.

17. In a spinning mule, having a carriage and means for driving the same in outward and inward runs, the combination of spindles, a variable speed driving mechanism therefor, a member movable upwardly and downwardly with a yarn, during the winding on of the yarn, means for operating said driving mechanism at a predetermined speed at the beginning of each winding on period, and means operated by the movement of said member which moves with the yarn, and movable proportionally to the movement thereof during the winding on of the yarn, to increase the speed of said driving mechanism in response to upward movement of said member and to decrease the speed of said driving mechanism in response to downward movement of said member.

18. In a spinning mule, having a carriage and means for driving the same in outward and inward runs, the combination of spindles, an electrically controlled variable speed driving mechanism therefor, comprising a magnetic slip coupling, a voltage shaping circuit for supplying control voltage to said coupling during each inward run of the carriage and containing a resistance element, a member movable upwardly and downwardly with the yarn being wound on during each winding-on period, means for applying excitation from said circuit to said coupling during each inward run of the carriage, and means operated by the movement of said upwardly and downwardly movable member to vary the resistance of said resistance element proportionally to the movement of said member and thereby to vary the excitation applied to said coupling.

19. In a spinning mule, having a carriage and means for driving the same in outward and inward runs, the combination of spindles, an electrically controlled variable speed driving mechanism therefor, comprising a magnetic slip coupling, a voltage shaping circuit for supplying control voltage to said coupling during each inward run of the carriage and containing a resistance element, and a condenser and a switch, a counterfaller movable upwardly and downwardly with the yarn being wound on during each inward run of the carriage, means to apply excitation from said circuit to said coupling during each such inward run, means operated by the said movement of the counterfaller to vary the resistance of said resistance element proportionally to the movement of said counterfaller and thereby to vary the excitation applied to said coupling, said circuit including means to charge said condenser prior to application of said circuit to said coupling and thereby to superpose on the voltage determined by the counterfaller a voltage represented by the difference between said last named voltage and a fixed value, and means for operating said switch and discharging said condenser as the winding-on operation commences.

20. In a spinning mule, having a carriage, spindles, and faller and counterfaller mechanisms, the combination of a tin roller connected to drive the spindles, means supplying power for rotating the tin roller in reverse during backing-off, a coupling for connecting said tin roller to said power-supplying means, means for rendering said coupling effective or ineffective, a timing member, and means controlled thereby acting on said last named means simultaneously with the beginning of movement of the faller from its inoperative to its operative position, and throughout the movement of the faller to its operative position, for rendering said coupling effective, and means thereupon acting to render said coupling ineffective.

21. In a spinning mule having a carriage and spindles, the combination of a tin roller connected to drive the spindles, means supplying power for rotating said tin roller in reverse during backing-off, a faller and counterfaller movable between operative and inoperative positions, means providing connections between said power supplying means and the faller and counterfaller for driving the latter from inoperative to operative position, means controlling the driving effectiveness of said connections, a coupling for connecting said tin roller to said power-supplying means, a timing member, and electro-magnetic means controlled thereby, operative at the beginning of backing-off and throughout the backing-off period, for operating said means controlling the driving effectiveness, making said connections effective and enabling the faller and counterfaller to move from inoperative to operative positions, and for making said coupling operative to back off the spindles during such movement of the faller and counterfaller.

22. In a spinning mule having a carriage and spindles, the combination of a tin roller connected to drive the spindles, a motor, a faller, a driving connection between said motor and tin roller, a driving connection between said motor and said faller, means for rendering said connections operative or inoperative, a control system, and means operated thereby, effective at and throughout the backing-off period for actuating said last named means to render said connections operative, to impart reverse rotation to the tin roller and simultaneously to drive said faller to its operative position.

23. In a spinning mule having a carriage and spindles, the combination of a reversible driving mechanism, a tin roller connected to drive the spindles, a faller movable between operative and inoperative positions, a shaft carrying said faller, separate couplings for enabling said driving mechanism to drive said tin roller and the faller shaft, timing means, a control system controlled thereby to operate at suitable times, and means operated by said control system to render both of said couplings operative to effect movement of the faller to operative position and simultaneously to impart reverse rotation to the tin roller for backing off, to reverse the driving mechanism and to engage the coupling to the faller shaft to drive the faller to its inoperative position at the conclusion of the winding on operation, and to render said couplings inoperative to drive the tin roller and the faller shaft at other times in the machine cycle.

24. In a spinning mule, the combination of a tin roller connected to drive the spindles, a faller, means for driving said faller to inoperative position at a time in the machine cycle prior to the backing-off period, latching means then effective to hold it in inoperative position, an electrical control system, means actuated thereby at the commencement of the backing-off period to unlatch said latching means, means thereupon effective to move said faller to operative position, and means actuated by such movement of the faller to rotate said tin roller in reverse, for backing-off.

25. In a spinning mule, the combination of a faller mechanism, means for driving the same to its inoperative position comprising a coupling arranged to engage until said faller has reached its extreme inoperative position and then to disengage, means operable to hold said faller against movement upon arrival in its extreme inoperative position, a control system, and means actuated thereby at the beginning of the backing-off period for releasing said holding means, enabling said faller to then move to its operative position.

26. In a spinning mule, the combination of a faller mechanism, including a faller and a faller shaft, means for driving the same to its inoperative position comprising a friction clutch embodying a constantly rotating member and a rotatable member arranged to engage the same until said faller has reached its extreme inoperative position and then to disengage, means operable to hold said faller against movement when said rotating and rotatable members are out of coupling engagement with each other, and until the mule is ready to back-off, a control system, means actuated thereby at the beginning of the backing-off period for releasing said holding means, and a counterweight then effective on the faller shaft for moving the faller to its operative position.

27. In a spinning mule organized to perform a machine cycle including a backing-off period, the combination of a tin roller connected to drive the spindles, a faller, means for driving said faller to inoperative position at a time in the machine cycle prior to the backing-off period, latching means then effective to hold it in inoperative position until the mule is ready to back-off, connections for driving said tin roller in reverse comprising a rotatable member and a coupling connecting the same with the shaft of said tin roller, means for locking said coupling, an electrical control system, means actuated thereby at the commencement of the backing-off period to unlatch said faller-holding means and to operate said tin roller coupling locking means, weighted means thereupon effective to move said faller to its operative position, and means actuated by such movement for rotating said rotatable member in the tin roller driving connections and thereby imparting backing-off rotation to said tin roller.

28. In a spinning mule, the combination of a carriage arranged to make outward and inward runs, a variable speed carriage-driving mechanism, a timing control member, means for moving the control member cyclically at such speed as to complete one cycle of movement substantially with the completion of one outward and one inward run of said carriage, contacts actuated by said member at different points in its travel, an electrical control system operable upon the actuation of some of said contacts to vary the speed of said driving mechanism as required at different times, a switch positioned to be actuated by said carriage at a determined point in its travel, and means operated by the actuation of said switch and by the actuation of one of said contacts to synchronise the movements of said carriage and control member, said last named contact having a position in the cycle of movement of said member corresponding to the position of said switch in the cycle of movement of said carriage.

29. In a spinning mule, the combination of a carriage movable to make outward and inward runs, a variable speed mechanism for driving the same at a speed determined by an excitation voltage applied to said driving mechanism, a timing control member, means for moving the latter cyclically during the operation of the mule, contacts actuated by said control member at different points in its travel, voltage shaping circuits for controlling the carriage, comprising one for the outward run, one for the inward run, and one for applying stop excitation to said driving mechanism, and means for selectively applying excitation from said voltage shaping circuits to said driving mechanism upon the actuation of said contacts.

30. In a spinning mule, the combination of spindles, a carriage arranged to make outward and inward runs, a variable speed driving mechanism for driving the spindles at a speed determined by the magnitude of an excitation voltage applied to said spindle driving mechanism, means for driving said carriage at appropriate speeds, a set of voltage shaping circuits arranged to develop different excitation voltages, and means for applying said voltage shaping circuits to said spindle driving mechanism at proper times to produce suitable spindle speeds during the outward and inward runs of the carriage.

31. In a spinning mule, the combination of spindles, a carriage arranged to make outward and inward runs, a variable speed driving mechanism for driving the spindles at a speed determined by the magnitude of an excitation voltage applied to said spindle driving mechanism, a second variable speed driving mechanism for driving the carriage at a speed determined by the magnitude of an excitation voltage applied to said carriage driving mechanism, a set of voltage shaping circuits arranged to develop different excitation voltages which are selectively applicable to said spindle driving mechanism at different times in the machine cycle to effect appropriate variations in the speed of the spindles, another set of voltage shaping circuits arranged to develop different excitation voltages which are selectively applicable to said carriage driving mechanism at different times in the machine cycle to effect appropriate variations in the speed of the carriage, and means for applying said circuits to their associated driving mechanisms at the proper times.

References Cited in the file of this patent

UNITED STATES PATENTS

| | | |
|---|---|---|
| 964,378 | Bodemer | July 12, 1910 |
| 1,275,406 | Dunham | Aug. 13, 1918 |
| 1,903,588 | Dethier | Apr. 11, 1933 |

FOREIGN PATENTS

| | | |
|---|---|---|
| 296,756 | Great Britain | Sept. 19, 1929 |
| 444,018 | Great Britain | Mar. 6, 1936 |
| 990,150 | France | June 6, 1951 |